US008950872B2

(12) United States Patent
Hasegawa et al.

(10) Patent No.: US 8,950,872 B2
(45) Date of Patent: Feb. 10, 2015

(54) IMAGE PROJECTING DEVICE, IMAGE PROCESSING DEVICE, IMAGE PROJECTING METHOD, AND COMPUTER-READABLE RECORDING MEDIUM

(75) Inventors: Fumihiro Hasegawa, Tokyo (JP); Shinichi Sumiyoshi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 339 days.

(21) Appl. No.: 13/595,425

(22) Filed: Aug. 27, 2012

(65) Prior Publication Data

US 2013/0057707 A1 Mar. 7, 2013

(30) Foreign Application Priority Data

Sep. 1, 2011 (JP) .................................. 2011-190819
Jun. 4, 2012 (JP) .................................. 2012-127398

(51) Int. Cl.
*G03B 21/14* (2006.01)
*G06K 9/34* (2006.01)
*H04N 9/31* (2006.01)
(Continued)

(52) U.S. Cl.
CPC ........... *H04N 9/3185* (2013.01); *H04N 9/3197* (2013.01); *H04N 7/26675* (2013.01); *H04N 19/00393* (2013.01); *H04N 19/00406* (2013.01); *H04N 1/00769* (2013.01); *H04N 5/2178* (2013.01); *H04N 13/0425* (2013.01); *H04N 9/3194* (2013.01); *G06T 7/0057* (2013.01);
(Continued)

(58) Field of Classification Search
CPC . H04N 9/3185; H04N 9/3194; H04N 9/3197; H04N 7/26675; H04N 19/00393; H04N 19/00406; H04N 2201/33385; H04N 1/00769; H04N 5/2178; H04N 13/0425
USPC ........... 353/69, 70; 702/85, 93; 382/172, 237; 348/189
See application file for complete search history.

(56) References Cited

U.S. PATENT DOCUMENTS

2004/0061838 A1 * 4/2004 Mochizuki et al. ............. 353/69
2005/0041217 A1 * 2/2005 Tajima ........................... 353/69
(Continued)

FOREIGN PATENT DOCUMENTS

| JP | H09-280837 | 10/1997 |
|---|---|---|
| JP | 2005-326247 | 11/2005 |
| JP | 2010-028411 | 2/2010 |

OTHER PUBLICATIONS

U.S. Appl. No. 13/526,657, filed Jun. 19, 2012, Hasegawa.

*Primary Examiner* — Georgia Y Epps
*Assistant Examiner* — Magda Cruz
(74) *Attorney, Agent, or Firm* — Harness, Dickey & Pierce

(57) ABSTRACT

Disclosed is an image projecting device, including a projecting part configured to project an image for calibration onto a projection object, an image capturing part configured to capture an image of an area including the projection object with a projected image for calibration, a binary image producing part configured to calculate plural first thresholds corresponding to plural first divided areas provided by dividing the area, based on a captured image, and to produce a binary image of the captured image, based on the first thresholds, and a corresponding point sampling part configured to sample corresponding points between the image for calibration and the binary image.

11 Claims, 22 Drawing Sheets

(51) Int. Cl.
  *H04N 19/25* (2014.01)
  *H04N 19/21* (2014.01)
  *H04N 1/00* (2006.01)
  *H04N 5/217* (2011.01)
  *H04N 13/04* (2006.01)
  *G06T 7/00* (2006.01)
  *G03B 17/54* (2006.01)
(52) U.S. Cl.
  CPC ....... *G03B 17/54* (2013.01); *G06T 2207/20021* (2013.01); *G06T 2207/20148* (2013.01)
  USPC ................. 353/70; 353/69; 702/85; 702/193; 382/172; 382/237; 348/189

(56) References Cited

U.S. PATENT DOCUMENTS

2007/0025625 A1* 2/2007 Burian et al. ................. 382/237
2010/0014778 A1   1/2010 Imai

* cited by examiner

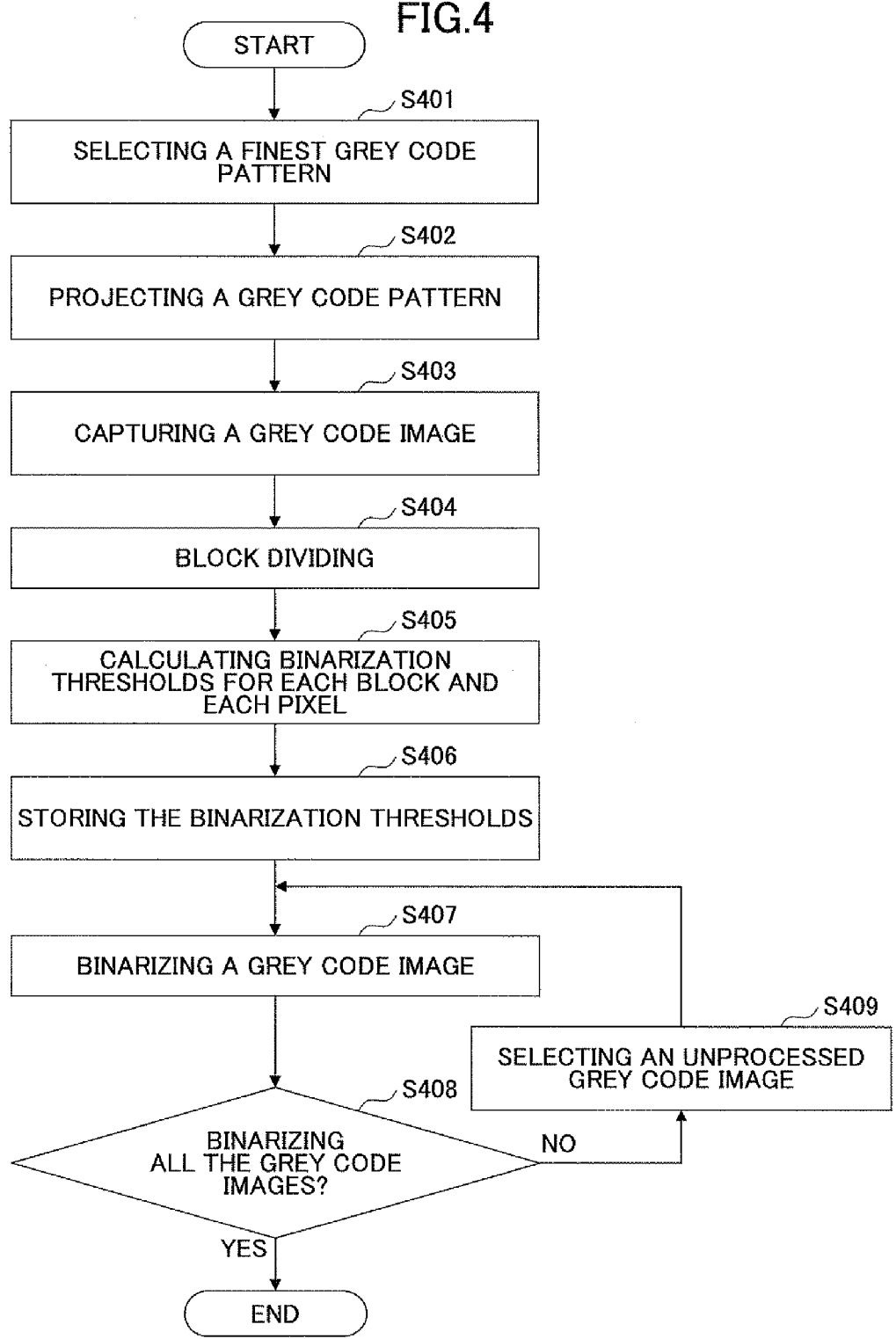

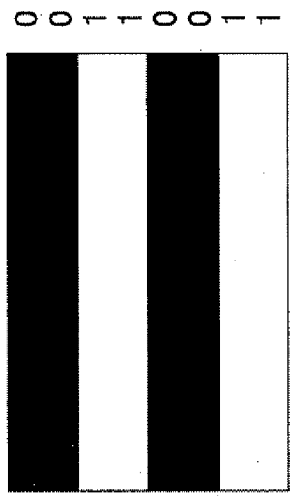
FIG.7A
FIG.7B
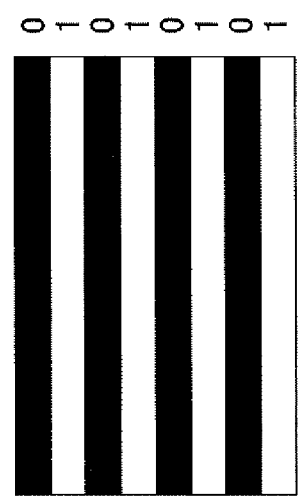
FIG.7C
FIG.7D

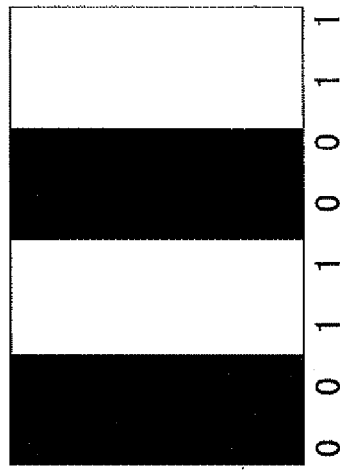
FIG.7F
FIG.7H
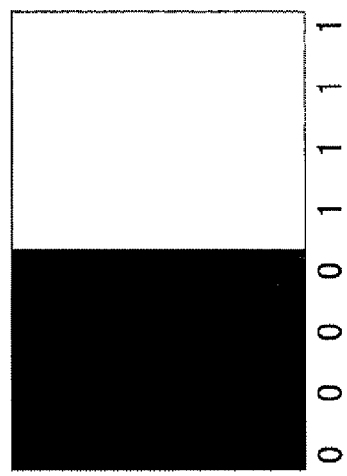
FIG.7E
FIG.7G

IMAGE PROJECTING DEVICE, IMAGE PROCESSING DEVICE, IMAGE PROJECTING METHOD, AND COMPUTER-READABLE RECORDING MEDIUM

BACKGROUND OF THE INVENTION

1. Field of the Invention

An aspect of the present invention relates to at least one of an image projecting device, an image processing device, an image projecting method, and a computer-readable recording medium.

2. Description of the Related Art

An image projecting device (a projector, etc.) is a device for projecting an image onto a projection object such as a screen. When an image is projected, a trapezoidal distortion may be caused on a projected image depending on a relationship between relative positions of an image projecting device and a projection object. Hence, an image projecting device may capture a projected image and correct a trapezoidal distortion of a projected image based on such a captured image.

Japanese Patent Application Publication No. 2010-028411 discloses a technique for projecting an image including characteristic points arrayed at equal spaces onto a projection surface, capturing an image of such a projection surface, calculating an amount of distortion (positional displacement) of a characteristic point, and correcting an image to be projected, depending on the calculated amount of distortion.

Japanese Patent Application Publication No. 2005-326247 discloses a technique for projecting a predetermined pattern image, sampling a planar area corresponding to a projection surface from a captured pattern image provided by capturing an image of the projection surface on a condition at that time, calculating a plane projection matrix from points on such a planar area, and calibrating an image to be projected based on such a plane projection matrix.

When interior illumination turns on (when light is incident on only an upper portion of a projection object) or when there is a local irregularity on a surface of a projection object, an image projecting device may project an image onto a projection object.

In any of techniques disclosed in Japanese Patent Application Publication No. 2010-028411 and Japanese Patent Application Publication No. 2005-326247, an image of a projection object on which an image is projected is captured and the captured image is binarized by using a constant threshold, whereby sampling of a characteristic point and sampling of a planar area are conducted. Accordingly, when a projection object is partially bright, or is partially dark due to an irregularity of a surface of the projection object, it may be possible to sample a characteristic point or a planar area.

SUMMARY OF THE INVENTION

According to one aspect of the present invention, there is provided an image projecting device, including a projecting part configured to project an image for calibration onto a projection object, an image capturing part configured to capture an image of an area including the projection object with a projected image for calibration, a binary image producing part configured to calculate plural first thresholds corresponding to plural first divided areas provided by dividing the area, based on a captured image, and to produce a binary image of the captured image, based on the first thresholds, and a corresponding point sampling part configured to sample corresponding points between the image for calibration and the binary image.

According to another aspect of the present invention, there is provided an image processing device, including a projecting part configured to project plural images for calibration onto a projection object, an image capturing part configured to capture images of an area including the projection object with plural projected images for calibration, a binary image producing part configured to calculate plural first thresholds corresponding to plural first divided areas provided by dividing the area based on captured plural images, calculate plural second thresholds corresponding to plural second divided areas provided by further dividing the first divided areas using calculated first thresholds, and produce binary images of captured images based on the calculated first thresholds and second thresholds, and a corresponding point sampling part configured to sample corresponding points between the images for calibration and the binary images, wherein the binary image producing part is configured to calculate the first thresholds and the second thresholds using one image among the captured plural images and produces a binary image of another image among the plural images using the calculated first thresholds and second thresholds.

According to another aspect of the present invention, there is provided an image projecting method, including a step of projecting a first image for calibration onto a projection object, a step of capturing an image of an area including the projection object with a projected first image for calibration, a step of calculating plural first thresholds corresponding to plural first divided areas provided by dividing the area based on a captured image, a step of projecting a second image for calibration onto a projection object, a step of capturing an image of an area including the projection object with a projected second image for calibration, a step of producing binary images of images provided by capturing images of areas including the projection object(s) with the projected first image for calibration and the projected second image for calibration, based on the first thresholds, and a step of sampling corresponding points between the first image for calibration and second image for calibration and the binary images.

According to another aspect of the present invention, there is provided a computer-readable recording medium, including a recoded program configured to cause a computer to execute the image projecting method as described above.

BRIEF DESCRIPTION OF THE DRAWINGS

FIG. 4 is a flow chart diagram illustrating one example of operations for producing a binary image.

FIGS. 7A, 7B, 7C, 7D, 7E, 7F, 7G, and 7H are illustration diagrams illustrating one example of grey code patterns and coding.

DETAILED DESCRIPTION OF THE PREFERRED EMBODIMENTS

Some embodiments of the present invention will be described by using an image processing device wherein a captured image area is divided based on an image provided by capturing an image of an area including a projection object and a threshold of binarization corresponding to a divided area is calculated.

First Embodiment (A Configuration of an Image Processing Device)

Figure 1:
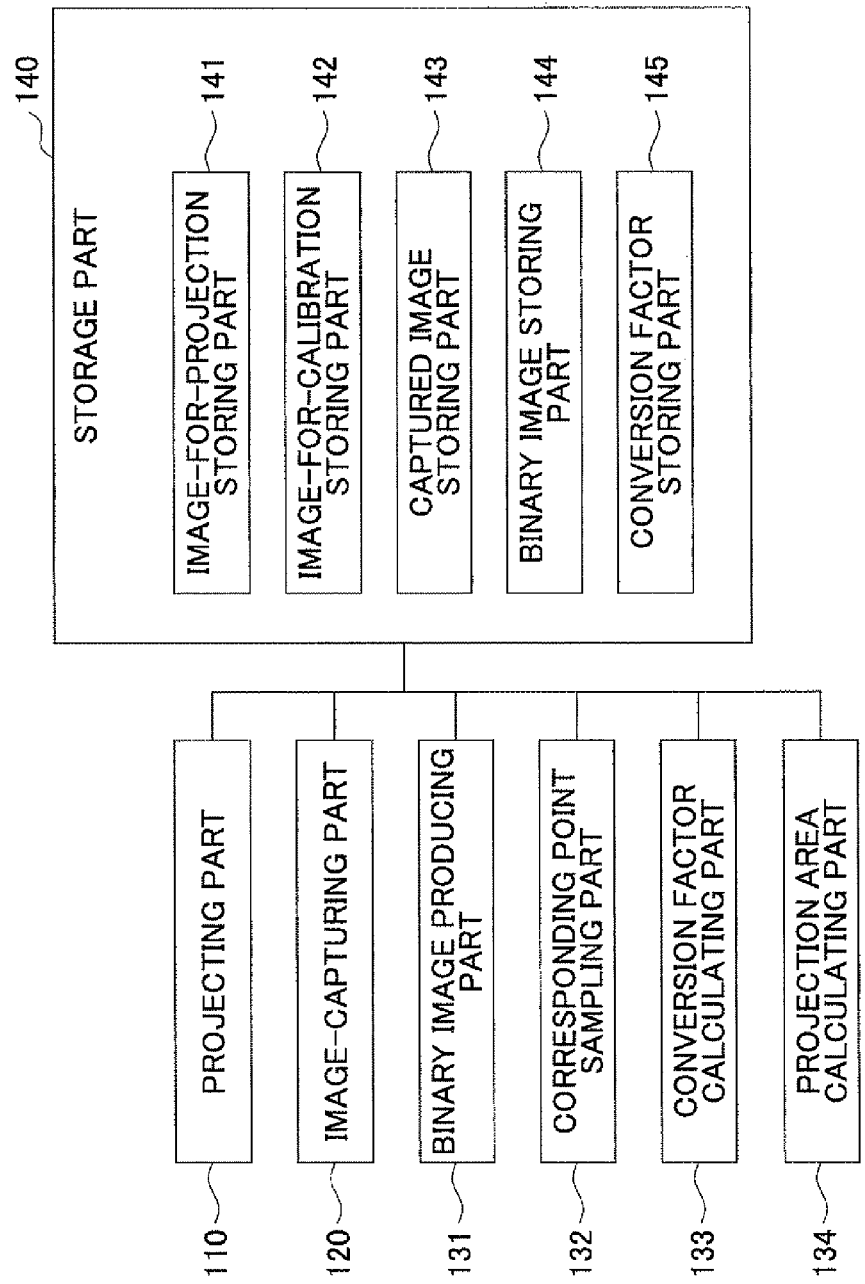
FIG. 1 is a schematic configuration diagram illustrating one example of an image processing device and image projecting device.

FIG. 1 illustrates a schematic configuration diagram of an image processing device 100 according to a first embodiment of the present invention.

As illustrated in FIG. 1, the image processing device 100 according to the present embodiment includes a projecting part 110, an image capturing part (photographing part) 120, a binary image producing part 131, a corresponding point sampling part 132, a conversion factor calculating part 133, a projection area calculating part 134, and a storage part 140.

In the present embodiment, the image processing device 100 projects a predetermined image onto an object onto which an image is projected (referred to as a "projection object", below) by using the projecting part 110. Furthermore, the image processing device 100 calculates information for correction of an image to be projected, by using the image capturing part 120 and the binary image producing part 131, etc. Herein, for a projection object, it is possible to use an object with an outer surface onto which it is possible to project an image, such as a screen, a wall, or a white board.

Furthermore, it is possible for an image to be projected to include a dynamic image and/or a static image. It is possible for a dynamic image to include a video image with a motion.

The projecting part 110 is a part for projecting an image onto a projection object by using a lens for projection, etc. In the present embodiment, the projecting part 110 projects onto a projection object an image for projection (original image data ImgO) and an image for calibration (grey code pattern) stored (contained) in an image-for-projection storing part 141 and image-for-calibration storing part 142 of the storage part 140, respectively. Furthermore, the projecting part 110 deforms (corrects) an image to be projected, based on information for correction calculated from the conversion factor calculating part 133, and projects an deformed image.

The image capturing part 120 is a part for imaging an image of an area including a projection object onto an image capturing element (for example, an image sensor) and capturing an image output signal from such an image capturing element as camera image data ImgC. In the present embodiment, the image capturing device 120 outputs captured camera image data ImgC to a captured image storing part 143 of the storage part 140.

The binary image producing part 131 is a part for producing a binary image from an image of an area including a projection object as captured by the image capturing part 120. The binary image producing part 131 produces a binary image through image processing based on camera image data ImgC captured by the image capturing part 120. Herein, a binary image is an image provided by converting an image into a white or black, or two-color, (binary) image by using a threshold described below. Its details will be described in the following (image binarizing operation).

The corresponding point sampling part 132 is a part for sampling plural positions (referred to as "corresponding points", below) with respect to an area including a projection object, based on a binary image produced by the binary image producing part 131. The conversion factor calculating part 133 is a part for calculating information for correction of an image to be projected (image processing such as scaling or a trapezoidal correction, referred to as "correction", below), based on a binary image. The projection areas calculating part 134 is a part for calculating a projection area of a projection object based on a camera image data ImgC captured by the image capturing part 120. The detail of an operation of the corresponding point sampling part 132 will be described in the following (corresponding point sampling operation). The details of operations of the conversion factor calculating part 133 and projection area calculating part 134 will be described in the following (information-for-correction calculating operation).

The storing part 140 includes the image-for-projection storing part 141, the image-for-calibration storing part 142, the captured image storing part 143, a binary image storing part 144, and a conversion factor storing part 145.

The image-for-projection storing part 141 stores original image data ImgO. Original image data ImgO are inputted from an external device (such as a PC). The image-for-calibration storing device 142 stores an image for calibration (grey code pattern, calibration pattern, etc.) to be projected onto a projection object at time of calibration. In the present embodiment, for an image for calibration (grey code image), it is possible to use a stripe-type grey code pattern Cg provided by combining a white color and a black color (for example, FIGS. 7A, 7B, 7C, 7D, 7E, 7F, 7G, and 7H).

The captured image storing part 143 stores camera image data ImgC captured by the image capturing part 120. The binary image storing part 144 stores binary image data ImgT as data for a binary image produced by the binary image producing part 131. The conversion factor storing part 145 stores data for a projective conversion factor (Hcp, Hoc, and H, etc.) described below, as data for correction of an image to be projected.

Additionally, "original image data ImgO" which are data for an image, in the description provided below, are image data for an image to be projected which is inputted from a PC to a projecting part (such as a projector).

"camera image data ImgC" are image data for an image provided in such a manner that the image capturing part 120 captures an image for projected original image data ImgO. Camera image data ImgC are produced by digitally processing an electric signal (pixel output signal) with respect to a contrast of light received by a light receiving element of the image capturing part 120, etc.

"projector image data ImgP" are image data for an image provided by correcting original image data ImgO in order to eliminate a trapezoidal distortion, etc., appealing in an image for camera image data ImgC. Projector image data ImgP are produced by using a projection conversion factor described below.

"binary image data ImgT" are image data for an image provided by image processing for converting an image for camera image data ImgC into two-color (binary) image. Binary image data ImgT are produced by using a threshold described below.

(Image Processing Operation)

Figure 2:
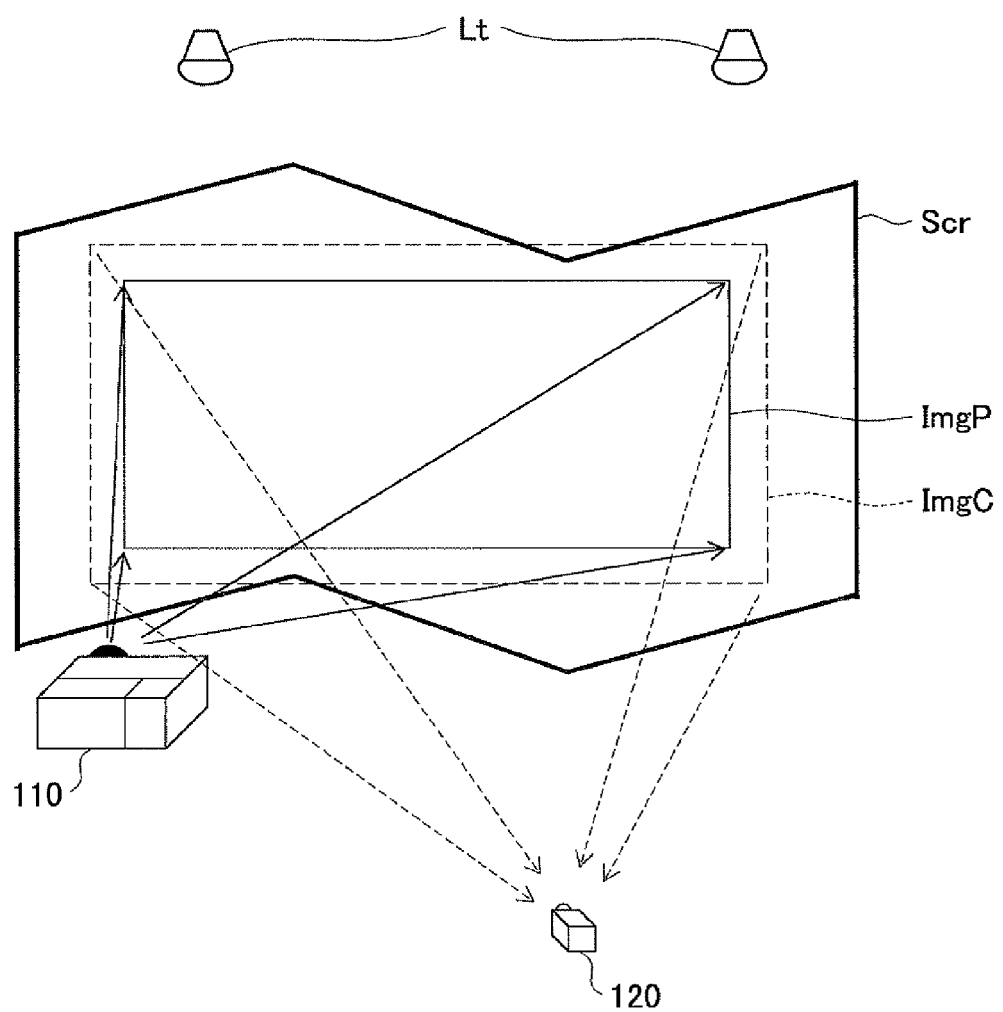
FIG. 2 is an illustration diagram illustrating one example of an operation for projecting and capturing an image.
Figure 3:
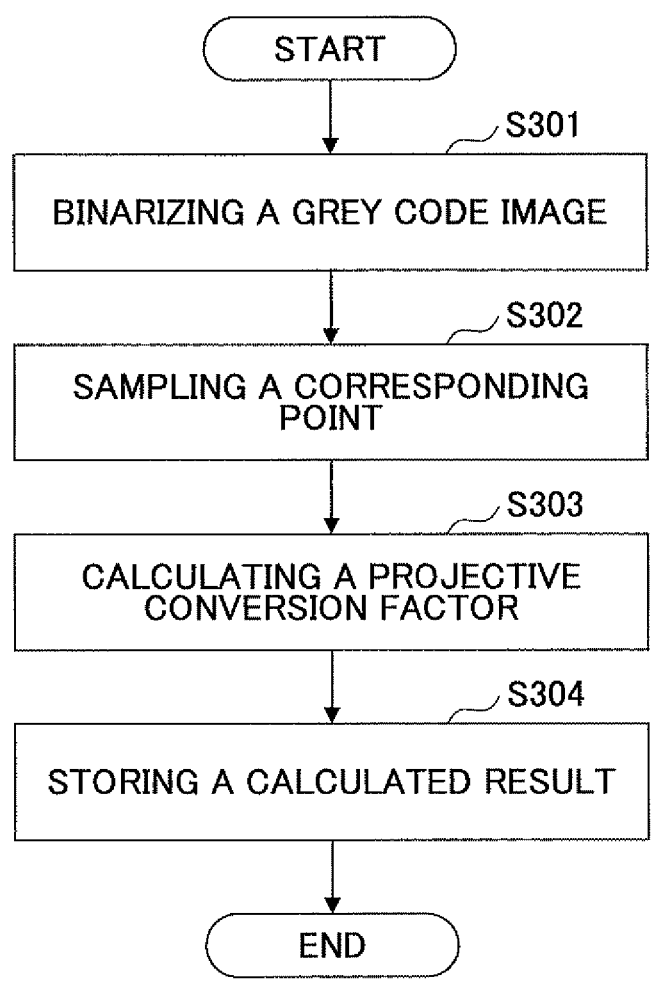
FIG. 3 is a flow chart diagram illustrating one example of operations of an image processing device.

An operation for image-processing an image captured by an image processing device will be described by using FIG. 2 and FIG. 3. FIG. 2 is a diagram illustrating an operation for projecting an image onto a projection object and capturing an image of an area including a projection object with a projected image. FIG. 3 is a flow chart diagram illustrating an operation for image-processing a captured image.

As illustrated in FIG. 2, in the present embodiment, illumination Lt turns on above a projection object (screen) Scr. Accordingly, a brightness of an image provided by capturing an image of a top of the projection object Scr is high while a brightness of an image provided by capturing an image of a bottom of the projection object Scr is low. First, the projecting part 110 projects a grey code pattern stored in an image-for-calibration storing part onto the projection object Scr as an image to be projected (projector image data ImgP). Then, the image capturing part 120 captures an image of (or capturing) light reflected from an area including the projection object Scr with a projected image (camera image data ImgC).

Next, an operation for image-processing a captured image will be described by using FIG. 3.

As illustrated in FIG. 3, an image processing device (or a binary image producing part) according to the present embodiment produces a binary image (binary image data ImgT) from an image of a projection object on which a grey code pattern captured by a image capturing part is projected (referred to as a "grey code image", below) (step S301). The detail of an operation for producing a binary image will be described in the following (operation for binarizing an image). As an operation for producing a binary image is completed, the image processing device stores binary image data ImgT in a binary image storing part. Then, the image processing device goes to step S302.

At step S302, the image processing device (or a corresponding point sampling part) samples a corresponding point with respect to an area including a projection object based on a binary image produced by a binary image producing part. The detail of an operation for sampling a corresponding point will be described in the following (operation for sampling a corresponding point). As sampling of a corresponding point is completed, the image processing device goes to step S302.

At step S303, the image processing device (or a conversion factor calculating part) calculates information for correction (a projective conversion factor, etc.) based on a produced binary image and a sampled corresponding point. The detail of an operation for calculating information for correction will be described in the following (operation for calculating information for correction). As calculation of information for correction is completed, the image processing device goes to step S304.

At step S304, the image processing device outputs a result of calculation at step S303 to a conversion factor storing part (storage part). Herein, the conversion factor storing part stores a result of calculation. Then, the image processing device goes to "END" in the figure and ends the operation for image-processing a captured image.

(Image Binarizing Operation)

Figure 5B:
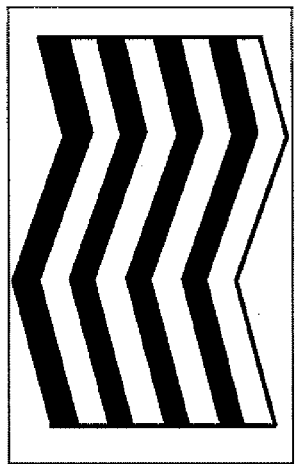
FIGS. 5A, 5B, 5C, 5D, 5E, 5F, 5G, and 5H are illustration diagrams illustrating one example of grey code images.
Figure 5D:
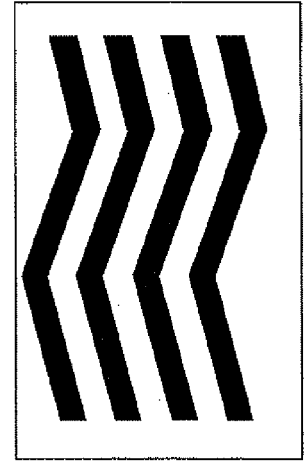
Figure 5A:
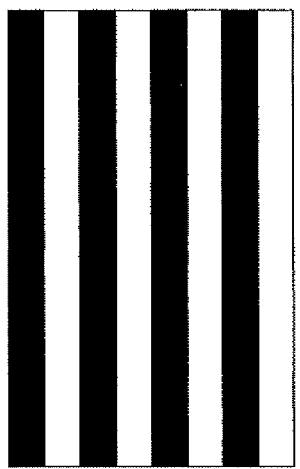
Figure 5C:
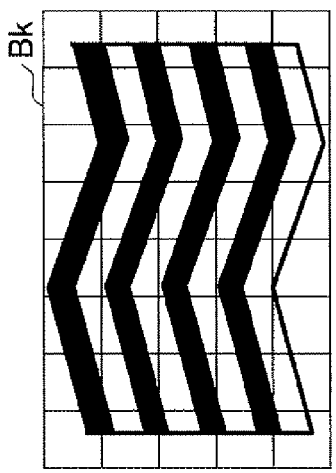
Figure 5F:
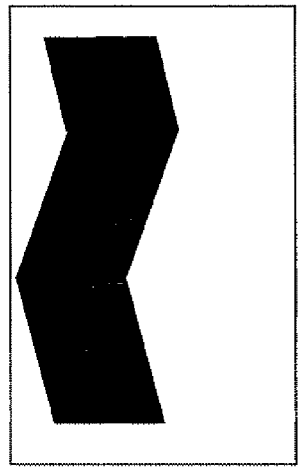
Figure 5H:
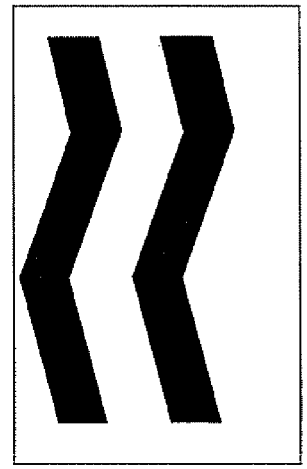
Figure 5E:
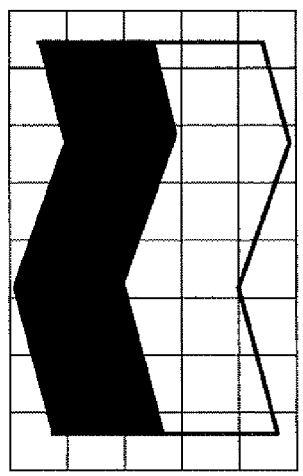
Figure 5G:
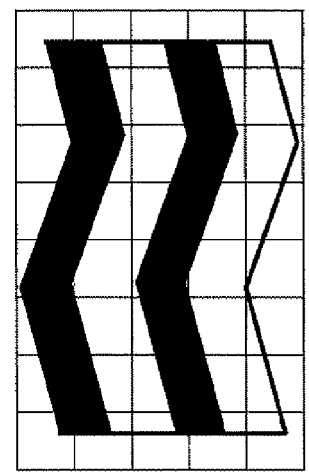
Figure 6:
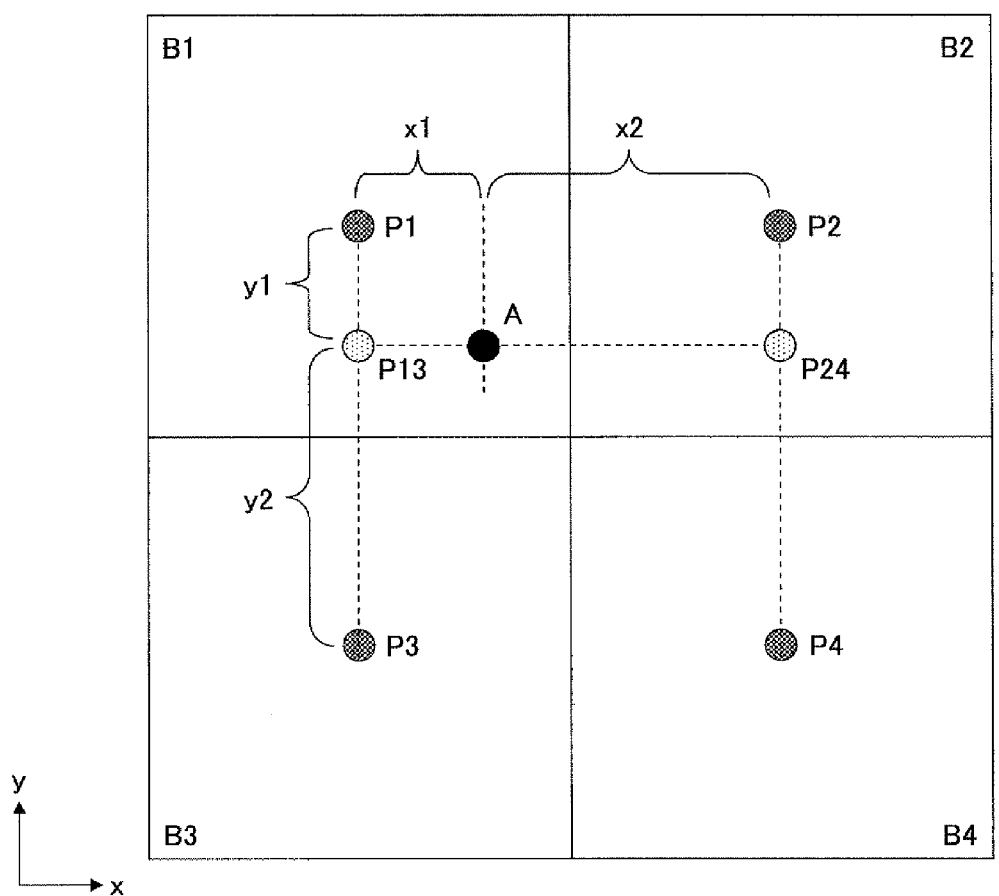
FIG. 6 is an illustration diagram illustrating a linear interpolation for a threshold.

An operation of an image processing device to produce a grey code image to a binary image will be described by using FIG. 4, FIGS. 5A, 5B, 5C, 5D, 5E, 5F, 5G, and 5H, and FIG. 6. FIG. 4 is a flow chart diagram illustrating an operation for producing a binary image. FIGS. 5A, 5B, 5C, 5D, 5E, 5F, 5G, and 5H are diagrams illustrating examples of a grey code image, etc. FIG. 6 is a diagram illustrating a linear interpolation for a threshold.

As illustrated in FIG. 4, an image processing device selects a horizontal stripe pattern with a smallest stripe width (for example, FIG. 7C as described below) among stripe-type grey code patterns Cg (for example, FIGS. 7A, 7B, 7C, 7D, 7E, 7F, 7G, and 7H as described below) stored in an image for calibration storing part and provided by combining a white color and a black color, and outputs it to a projecting part (step S401). Then, the image processing device goes to step S402.

At step S402, the image processing device projects a selected grey code pattern onto a projection object by using a projecting part. It is possible for a projecting part to project, for example, a grey code pattern as illustrated in FIG. 5A (projector image data ImgP). As projection is started, the image processing device goes to step S403.

At step S403, the image processing device captures an image of an area including a projection object with a projected grey code pattern by using an image capturing device. It is possible for an image capturing device to capture an image of (or capture), for example, a grey code image as illustrated in FIG. 5B (camera image data ImgC). As capturing of an image is completed, the image processing device goes to step S404.

At step S404, the image processing device divides a captured grey code image into blocks (first divided areas) by using a binary image producing part. It is possible for a binary image producing part to conduct division into, for example, block groups Bk as illustrated in FIG. 5C. As division is completed, the image processing device goes to step S405.

At step S405, the image processing device calculates a threshold for binarization (first threshold T1) for each block by using a binary image producing part. It is possible for a binary image producing part to use, for example, a discrimination analysis as a method for calculating a threshold for binarization. Herein, a discrimination analysis is a calculation method in which a histogram of brightness values of pixels in a block is produced and when it is assumed that such produced histogram has a double hump, a threshold is a value at which a separation between two humps is largest. Specifically, in a discrimination analysis, a value at which a ratio of an inter-group dispersion to an intra-group dispersion for pixel values grouped with respect to two humps is a maximum is calculated and such a calculated value is provided as a threshold.

Furthermore, it is possible for the image processing device to calculate a threshold (second threshold T2) corresponding to each pixel (second divided area Px) in a block from a threshold for each block by using a binary image producing part. Specifically, in a binary image producing part, a calculated threshold for each block is provided as a threshold for a pixel positioned at a center of such a block. Then, a binary image producing part calculates a threshold for each pixel in a block by using a linear interpolation.

FIG. 6 illustrates a diagram illustrating a linear interpolation for a threshold. As illustrated in FIG. 6, thresholds for blocks B1-B4 (thresholds for pixels positioned in centers of blocks) are P1-P4, respectively. Then, it is possible to calculate a threshold for an arbitrary position A from thresholds P13 and P24, by using a linear interpolation, based on thresholds for 4 blocks surrounding position A (bilinear interpolation). Herein, it is possible to calculate thresholds P13 and P24 by, for example, interpolation, from thresholds P1 and P3 and thresholds P2 and P4.

Additionally, a bicubic interpolation (interpolation with reference to surrounding 12 blocks) may be used for a linear interpolation for thresholds. Furthermore, for a linear interpolation for a threshold for a block positioned at an edge of an image, a threshold for a block (a threshold positioned at a center of a block) may be used for a threshold for each pixel in a block.

As calculation of thresholds for each block (first divided area Bk) and each pixel (second divided area Px) is completed, the image processing device goes to step S406.

Then, at step S406, the image processing device outputs a calculation result calculated at step S405 to a binary image storing part. Herein, a binary image storing part stores a result of calculation of a threshold. Then, the image processing device goes to step S407.

At step S407, the image processing device produces a binary image from a grey code image captured at step S403 by using a binary image producing part and using a threshold calculated at step S405. Specifically, it is possible for a binary image producing part to produce, for example, a binary image as illustrated in FIG. 5D. As production of a binary image is completed, the image processing device outputs a produced binary image to a binary image storing part. Herein, a binary image storing part stores a binary image as binary image data ImgT. Then, the image processing device goes to step S408.

At step S408, the image processing device produces binary images corresponding to grey code images captured by projecting all of grey code patterns (for example, FIGS. 7A, 7B, and 7C, and 7E, 7F, and 7G) by using a binary image producing part. Herein, for a threshold used for binarization, it is possible to use a threshold calculated at step S405 (a threshold calculated from a grey code pattern with a smallest stripe width). Thereby, it is possible for a binary image producing part to binarize even a grey code image with a large stripe width by an appropriate threshold. As production of binary images corresponding to all of grey code patterns is completed, the image processing device goes to "END" in the figure and ends the operation for binarizing an image. Otherwise, the image processing device goes to step S409 and repeats operations at step S407 and step S408 until production of all of binary images is completed.

As described above, according to an image processing device (or a binary image producing part) according to a first embodiment of the present invention, it is possible to calculate a threshold for binarization (first threshold T1) for each block and calculate a threshold (second threshold T2) corresponding to each pixel (second divided area Px) in a block, whereby it is possible to binarize a captured image (grey code image) by using such a calculated threshold.

Furthermore, according to an image processing device according to the present embodiment, it is possible to binarize a grey code image by using thresholds corresponding to each block and each pixel (first divided area and second divided area) of such a grey code image, whereby it is possible to produce a binary image without being influenced by interior illumination, etc. That is, according to an image processing device according to the present embodiment, it is possible to produce a binary image even when interior illumination turns on or when there is a local irregularity on a surface of a projection object, etc.

Moreover, according to an image processing device according to the present embodiment, it is possible to use a threshold for binarization calculated by using a stripe grey code with a smallest width, whereby it is possible to prevent a deficiency in production of a binary image which may be caused by in a case where a size of a divided block is small. Furthermore, an image processing device according to the present embodiment, it is possible to improve a characteristic for following a change of brightness inside a projection area, because it is possible to use a threshold for binarization calculated by using a stripe grey code with a smallest width. That is, it is possible for an image processing device according to the present embodiment to produce a binary image provided by following a variation of brightness of such an image.

(Corresponding Point Sampling Operation)

Figure 8A:
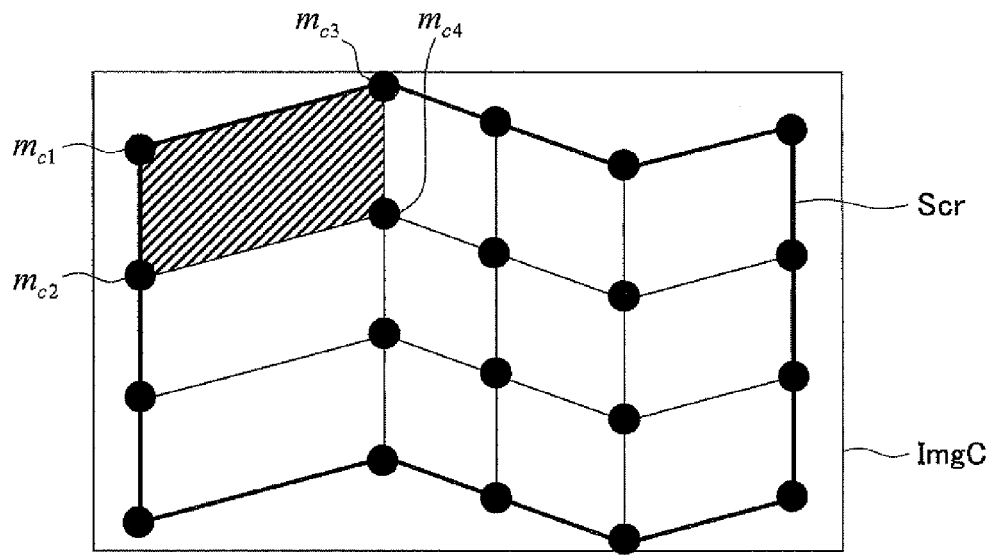
FIGS. 8A and 8B are illustration diagrams illustrating corresponding points to be sampled.
Figure 8B:
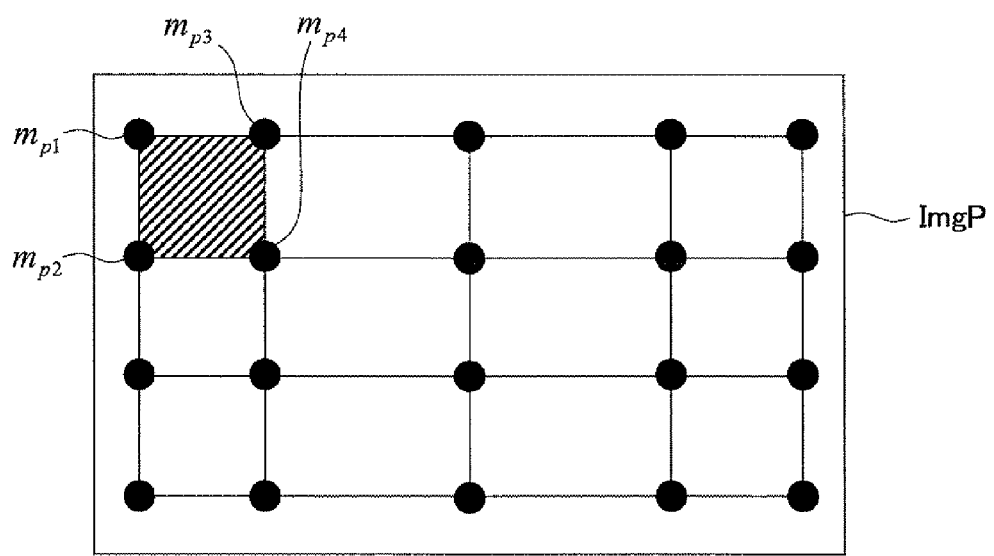

An operation of a corresponding point sampling part to sample a corresponding point on a binary image based on a binary image produced by a binary image producing part will be described by using FIGS. 7A, 7B, 7C, 7D, 7E, 7F, 7G, and 7H and FIGS. 8A and 8B. FIGS. 7A, 7B, 7C, 7D, 7E, 7F, 7G, and 7H are diagrams illustrating examples of grey code patterns. FIGS. 8A and 8B are diagrams illustrating a corresponding point to be sampled.

First, an image processing device projects grey code patterns with three kinds of horizontal stripes (for example, FIGS. 7A, 7B, and 7C) and grey code patterns with three kinds of vertical stripes (for example, FIGS. 7E, 7F, and 7G) onto a projection object by using a projecting part in time sequence as projector image data ImgP. Herein, the image processing device sequentially captures images of a projection object with respective projected grey code patterns by using an image capturing part so that grey code images (camera image data ImgC) are captured. Additionally, an image processing device for which it is possible to use an embodiment of the present invention may project, and capture images of, two or less kinds or four or more kinds of grey code patterns.

Then, the image processing device calculates thresholds corresponding to each block and each pixel of a captured grey code image and produces a binary image from such a grey code image based on calculated thresholds, by using a binary image producing part. Herein, a method for producing a binary image from a grey code image is similar to the foregoing (image binarizing operation), and hence its description(s) will be omitted.

Then, the image processing device encodes a produced binary image on a binary number code and divides it into grid-type areas by using a corresponding point sampling part. Specifically, a corresponding point sampling part provides each of divided binary image areas with a code by using six binary images provided by capturing images of a projection object with projected grey code patterns (FIGS. 7A, 7B, and 7C and FIGS. 7E, 7F, and 7G) in such a manner that a white area and black area of a binary image are provided with "1" bit and "0" bit, respectively. Herein, as attention is paid to an arbitrary area of a binary image, a code of "1" or "0" is provided like a in time sequence so that a unique correspondence (or coding) as a six-bit code is provided. Herein, an area to be coded is an area provided by dividing a binary image into grid-like ones, because a projected grey code has a vertical stripe and a horizontal stripe.

FIGS. 8A and 8B illustrate a binary image divided into gird-like areas. FIG. 8A provides an image provided by coding, and dividing into grid-like areas, a binary image for camera image data ImgC. FIG. 8B provides an image provided by coding, and dividing into grid-like areas, a binary image for projector image data ImgP.

Herein, an image processing device (or a corresponding point sampling part) selects edges (or four corners) of an arbitrary grid-like area as characteristic points $m_{C1}$ to $m_{C4}$ as illustrates in FIG. 8A. Furthermore, an image processing device (or a corresponding point sampling part) selects edges (or four corners) of a six-bit code area which correspond to characteristic points $m_{C1}$ to $m_{C4}$, as characteristic points $m_{P1}$ to $m_{P4}$, as illustrates in FIG. 8B. Herein, correspondence between characteristic points $m_{C1}$ to $m_{C4}$ and characteristic points $m_{P1}$ to $m_{P4}$ are provided and it is possible for the image processing device (or corresponding point sampling part) to sample characteristic points $m_{C1}$ to $m_{C4}$ (or characteristic points $m_{P1}$ to $m_{P4}$) as corresponding points. Furthermore, the image processing device (or corresponding point sampling part), in the present embodiment, samples corresponding points which correspond to all of areas divided into grid-like ones.

As described above, according to an image processing device (or a corresponding point sampling part) according to a first embodiment of the present invention, it is possible to binarize a grey code image by using thresholds corresponding to each block and each pixel of such a grey code image. Furthermore, according to an image processing device according to the present embodiment, it is possible to binarize a grey code image, whereby it is possible to sample corresponding points between a binary image for camera image data ImgC and a binary image for projector image data ImgP. That is, according to an image processing device according to the present embodiment, it is possible to sample a corresponding point of a binary image without being influences by interior illumination, etc., even when interior illumination turns on or when there is a local irregularity on a surface of a projection object, etc.

(Information-for-Correction Calculating Operation)

Figure 9:
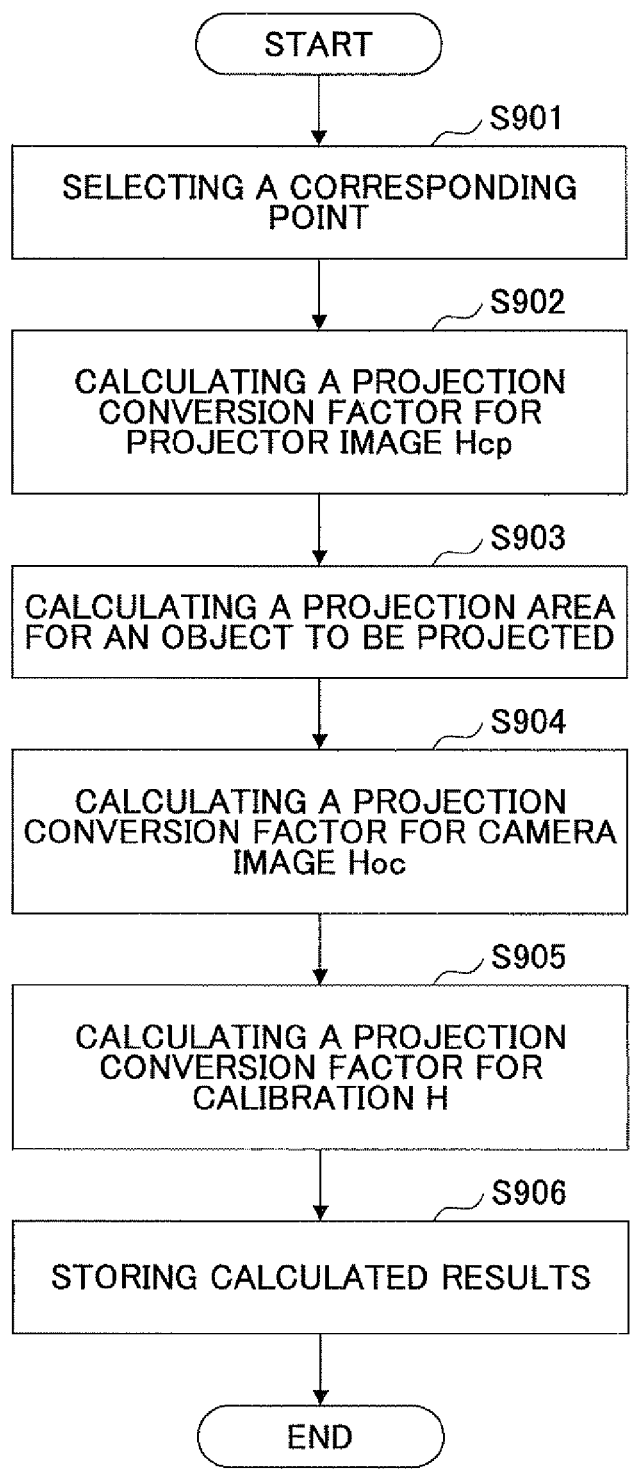
FIG. 9 is a flow chart diagram illustrating one example of operations for calculating a projection conversion factor.
Figure 10A:
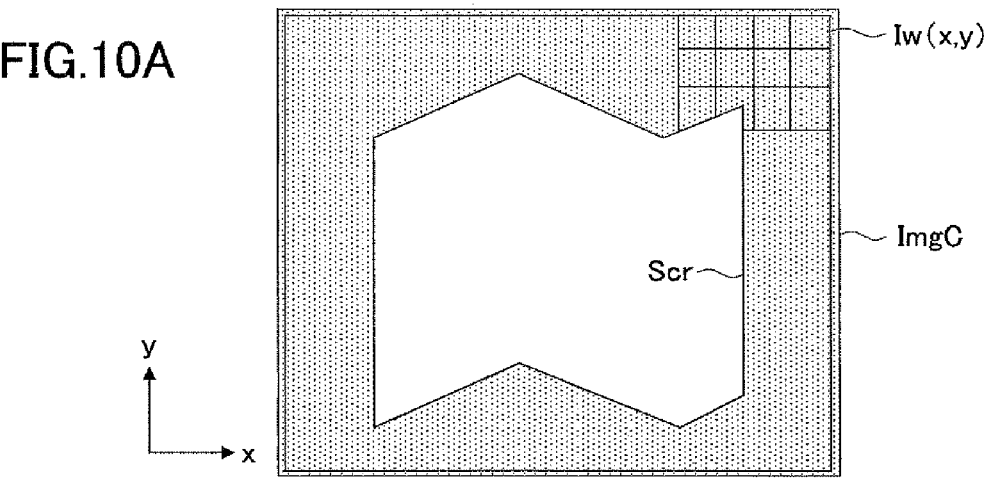
FIGS. 10A, 10B, and 10C are illustration diagrams illustrating one example of operations for calculating a projection area.
Figure 10B:
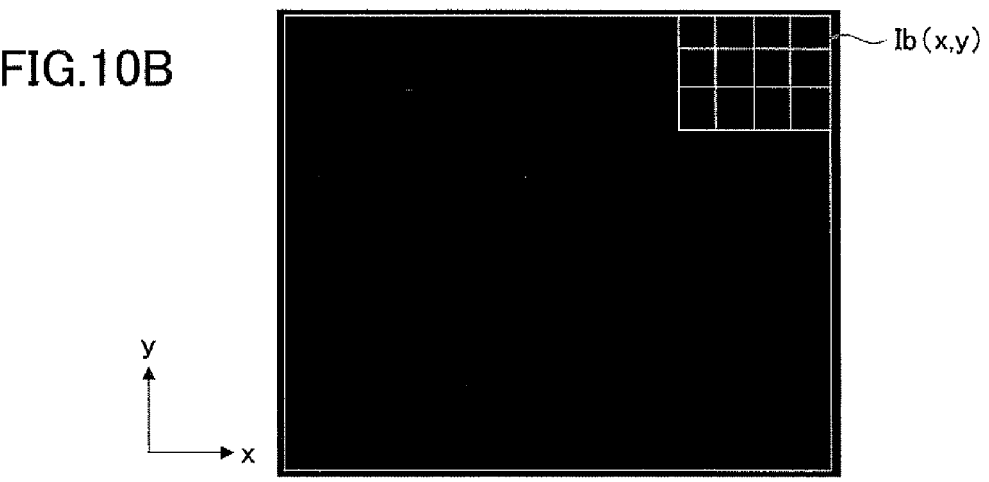
Figure 10C:
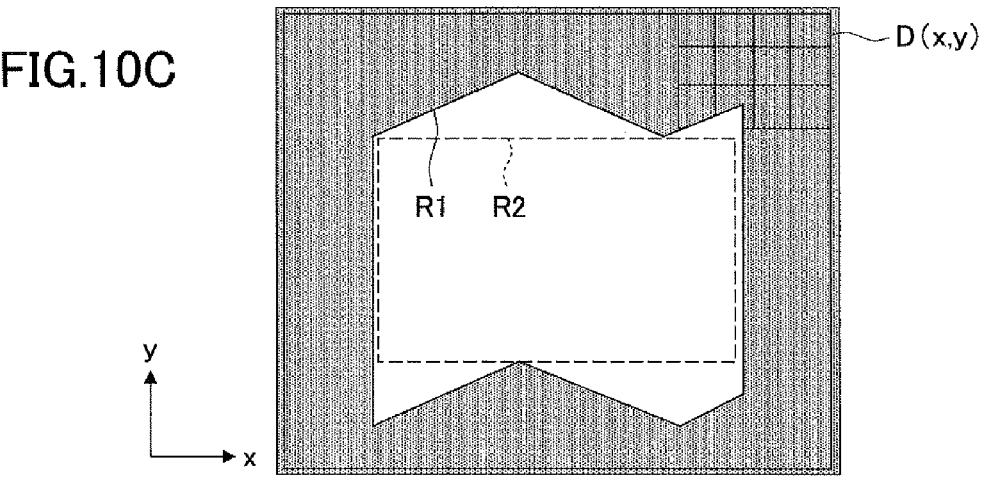

An operation of a conversion factor calculating part to calculate information for correction (or projective conversion factor) based on a binary image produced by a binary image producing part and a corresponding point sampled by a corresponding point sampling part will be described by using FIG. 9 and FIGS. 10A, 10B, and 10C. FIG. 9 is a flow chart diagram illustrating a procedure for calculating information for correction. FIGS. 10A, 10B, and 10C are diagrams illustrating an operation for calculating a projection area on a projection object.

As illustrated in FIG. 9, first, an image processing device selects a corresponding point sampled by a corresponding point sampling part (for example, $m_{C1}$ to $m_{C4}$ and $m_{P1}$ to $m_{P4}$ in FIGS. 8A and 8B) (step S901). Then, the image processing device goes to step S902.

At step S902, the image processing device calculates a projective conversion factor for projector image Hcp based on a selected corresponding point by using a conversion factor calculating part. Specifically, it is possible for a conversion factor calculating part to calculate a projective conversion matrix for projector image Hcp by using numerical formula 1 to numerical formula 4. Herein, when characteristic points for projector image data imgP which correspond to characteristic points $m_{Ci}$ ($X_{Ci}$, $y_{Ci}$) (i=1–4) for camera image data ImgC are $m_{Pi}$ ($x_{Pi}$, $y_{Pi}$) (i=1–4), a numerical formula 1:

$$\tilde{m} \cong Hcp \cdot \tilde{m}_{Ci}$$

is satisfied.

Herein, it is indicated that a right-hand side and a left-hand side in numerical formula 1 are equal in a homogenous coordinate system (or equal except a constant multiple of all components). Furthermore, it is possible for a projective conversion matrix for projector image Hcp to be represented by numerical formula 2:

$$Hcp = \begin{pmatrix} h_{CP1} & h_{CP2} & h_{CP3} \\ h_{CP4} & h_{CP5} & h_{CP6} \\ h_{CP7} & h_{CP8} & 1 \end{pmatrix}.$$

In that case, it is possible for numerical formula 1 to be represented by numerical formula 3:

$$\begin{pmatrix} x_{Pi} \\ y_{Pi} \\ 1 \end{pmatrix} = \begin{pmatrix} h_{CP1} & h_{CP2} & h_{CP3} \\ h_{CP4} & h_{CP5} & h_{CP6} \\ h_{CP7} & h_{CP8} & 1 \end{pmatrix} \begin{pmatrix} x_{Ci} \\ y_{Ci} \\ 1 \end{pmatrix} = \begin{pmatrix} h_{CP1}x_{Ci} + h_{CP2}y_{Ci} + h_{CP3} \\ h_{CP4}x_{Ci} + h_{CP5}y_{Ci} + h_{CP6} \\ h_{CP7}x_{Ci} + h_{CP8}y_{Ci} + 1 \end{pmatrix}.$$

When a right side thereof is normalized in order to make a third component of numerical formula 3 be equal to 1, numerical formula 4:

$$x_{Pi} = \frac{h_{CP1}x_{Ci} + h_{CP2}y_{Ci} + h_{CP3}}{h_{CP7}x_{Ci} + h_{CP8}y_{Ci} + 1}, \; y_{Pi} = \frac{h_{CP4}x_{Ci} + h_{CP5}y_{Ci} + h_{CP6}}{h_{CP7}x_{Ci} + h_{Cp8}y_{Ci} + 1}$$

is provided.

Herein, $h_{CP1}$ to $h_{CP8}$ are unknown factors. A conversion factor calculating part captures four combinations that are characteristic points $m_{Pi}$ ($x_{Pi}$, $y_{P}$i) for projector image data ImgP corresponding to characteristic points $m_{Ci}$ ($x_{Ci}$, $y_{Ci}$) for camera image data ImgC, whereby it is possible to calculate $h_{CP1}$ to $h_{CP8}$. Furthermore, it is possible for a conversion factor calculating part to calculate a projective conversion matrix for projector image Hcp by using calculated $h_{Cp1}$ to $h_{CP8}$. Moreover, it is possible for a conversion factor calculating part in the present embodiment to calculate projective conversion matrices for projector image Hcp corresponding to all of blocks divided into grid-like ones.

As calculation of projective conversion matrices for projector image Hcp is completed, the image processing device goes to step S903.

At step S903, the image processing device calculates a projection area on a projection object by using a conversion factor calculating part. Specifically, first, the image processing device projects an image whose entire area is white and an image whose entire area is black as a predetermined pattern by a projecting part. Herein, an image capturing part captures an image of an area including a projection object on which an image whose entire area is white and an image whose entire area is black have been projected (for example, FIG. 10A and FIG. 10B). Then, the image processing device calculates a brightness value Iw (x, y) at a position of pixel (x, y) in an image captured when an image whose entire area is white is projected, by using a conversion factor calculating part. Furthermore, the image processing device calculates a brightness value Ib (x, y) at a position of pixel (x, y) in an image captured when an image whose entire area is black is projected.

Then, the image processing device calculates a difference D (x, y) between brightness values from numerical formula 5:

$$D(x,y)=Iw(x,y)-Ib(x,y)$$

by using a conversion factor calculating part.

FIG. 10C illustrates a differential image representing a difference D (x, y) between brightness values. As illustrated in FIG. 10C, a white area R1 is an area on which a difference between brightness values is large. In the present embodiment, a conversion factor calculating part provides a white area R1 as an outline of a projection object.

Herein, it is possible for a white area to be an area with a difference between brightness values which is greater than or equal to a predetermined value. Furthermore, it is possible to sample a non-white area to calculate an outline of a projection object, and to provide an inside of a calculated outline as a white area. Additionally, a predetermined value is a value on which it is possible to be regarded as a surface of a projection object in a captured image. Furthermore, it is possible for a predetermined value to be a value predetermined by using a numerical calculation or an experiment, etc.

Then, the image processing device calculates a quadrangle R2 (FIG. 10C) included in a calculated white area R1 in such a manner that such a calculated quadrangle R2 is a projection area of projection object which is capable of being projected on, by using a conversion factor calculating part. As calculation of a projection area on a projection object is completed, the image processing device goes to step S904.

At step S904, the image processing device calculates a projective conversion factor for camera image Hoc based on a projection area on a projection object by using a conversion factor calculating part. Specifically, a conversion factor calculating part calculates a projective conversion factor for camera image Hoc to correct (scale or translate) an image for original image data ImgO so as to correspond to a quadrangle for a projection area on a projection object.

Herein, it is possible for a projective conversion factor for camera image Hoc to be represented by numerical formula 6:

$$Hoc = \begin{pmatrix} h_{OC1} & 0 & h_{OC3} \\ 0 & h_{OC5} & h_{OC6} \\ 0 & 0 & 1 \end{pmatrix}.$$

Additionally, a method for calculating a projective conversion factor for camera image Hoc is basically similar to that at step S902, and hence, its description(s) will be omitted. Furthermore, a conversion factor calculating part in the present embodiment calculates projective conversion factors for camera image Hoc corresponding to all of blocks divided into grid-like ones.

As calculation of projective conversion factors for camera image Hoc is completed, the image processing device goes to step S905.

At step S905, the image processing device calculates a projective conversion factor for calibration H based on a projective conversion factor for projector image Hcp and a projective conversion factor for camera image Hoc by using a conversion factor calculating part. Specifically, it is possible for a conversion factor calculating part to calculate a projective conversion factor for calibration H by using numerical formula 7:

$$H=Hcp\cdot Hoc.$$

Herein, it is possible for a projective conversion factor for calibration H to be represented by numerical formula 8:

$$H = \begin{pmatrix} h_1 & h_2 & h_3 \\ h_4 & h_5 & h_6 \\ h_7 & h_8 & 1 \end{pmatrix}.$$

In the present embodiment, a conversion factor calculating part calculates projective conversion matrices for calibration H corresponding to all of blocks divided into grid-like ones. As calculation of projective conversion matrices for calibration H is completed, the image processing device goes to step S906.

At step S906, the image processing device outputs a calculation result calculates at step S905 to a conversion factor storing part of a storage part. Herein, a conversion factor storing part stores a calculation result. Then, the image processing device goes to "END" in the figure and ends an operation for calculating information for correction.

As described above, according to an image processing device (or conversion factor calculating part) according to a first embodiment of the present invention, it is possible to calculate a projective conversion matrix for projector image Hcp and a projective conversion factor for camera image Hoc based on a produced binary image and a sampled corresponding point. Furthermore, according to an image processing device according to an embodiment of the present invention, it is possible to calculate information for correction (or a projective conversion factor for calibration H), because it is possible to calculate a projective conversion matrix for projector image Hcp and a projective conversion factor for camera image Hoc. Moreover, according to an image processing device according to the present embodiment, it is possible to calculate information for correction (or a projective conversion factor for calibration H) corresponding to blocks divided into grid-like ones, respectively, whereby it is possible to calculate information for correction without being influenced by interior illumination, etc. That is, according to an image processing device according to the present embodiment, it is possible to calculate information for correction without being influenced by interior illumination, etc., even when interior illumination turns on or when there is a local irregularity on a surface of a projection object, etc.

Second Embodiment

An embodiment of the present invention will be described by using an image processing device according to a second embodiment. Additionally, in the following descriptions, a configuration, etc., of an image processing device 400 according to a second embodiment is basically similar to a configuration, etc., of the aforementioned image processing device 100 according to the first embodiment, and hence, a different matter(s) will be described principally.

(Configuration of an Image Processing Device)

FIG. 1 illustrates a schematic configuration diagram of an image processing device 400 according to a second embodiment of the present invention.

In the present embodiment, a binary image producing part 131 of the image processing device 400 calculates a projection area (or a circumscribed rectangle as described below) and calculates a size (value) of a block (for example, bkx and bky in FIGS. 19A, 19B, and 19C as described below) based on a calculated projection area. Furthermore, the binary image producing part 131 calculates a threshold for binarization (first threshold T1, etc.) by using a block with a calculated size. Additionally, the image processing device 400 according to the present embodiment may calculate a block size and a projection area (or a circumscribed rectangle) by using a conversion factor calculating part 133 and a projection area calculating part 134.

(Image Processing Operation)

FIG. 2 and FIG. 3 illustrate an image processing operation of an image processing device according to the present embodiment. An operation for image-processing an image captured by an image processing device 400 according to the present embodiment is basically similar to an operation of the image processing device 100 according to the first embodiment, and hence, its description(s) will be omitted.

(Image Binarizing Operation)

An operation of an image processing device according to the present embodiment to produce a binary image from a grey code image will be described by using FIG. 4, FIG. 16, FIGS. 17A, 17B, and 17C, FIG. 18, FIGS. 19A, 19B, and 19C, and FIG. 20.

Figure 16:
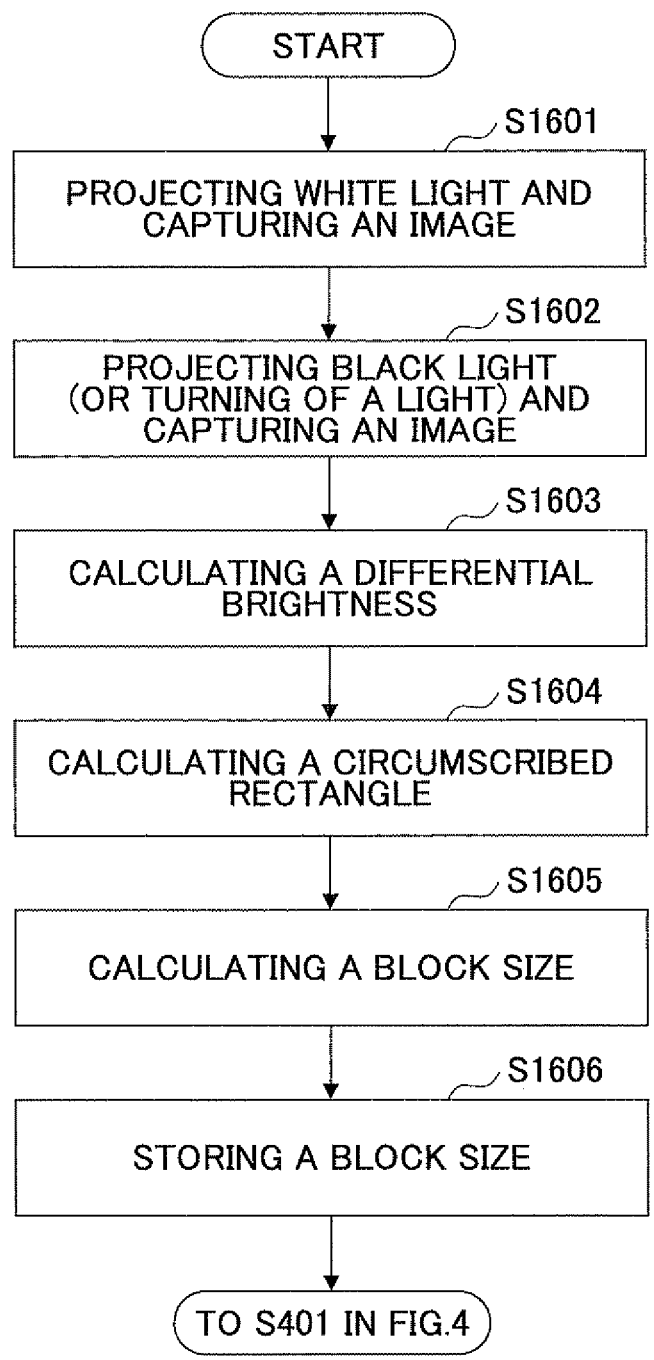
FIG. 16 is a flow chart diagram illustrating one example of binary image producing operations of an image processing device according to a second embodiment.

As illustrated in FIG. 16, an image processing device according to the present embodiment, first, projects white light (for example, a solid white image stored in an image-for-correction storing part) by using a projecting part at step S1601. Furthermore, the image processing device captures an image of a projection object on which white light has been projected by using an image capturing part.

Figure 17A:
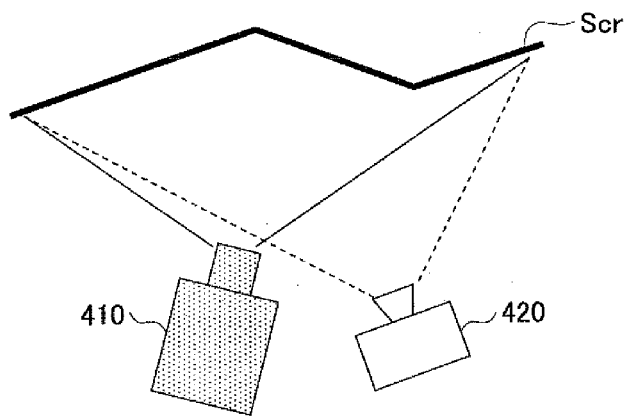
FIGS. 17A, 17B, and 17C are illustration diagrams illustrating a projecting operation of an image processing device according to a second embodiment.
Figure 17B:
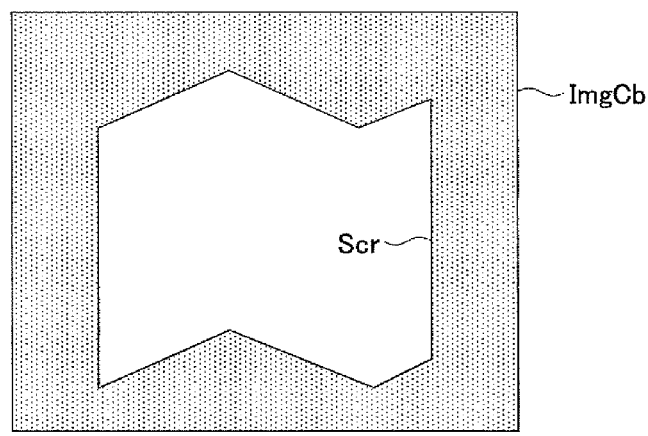
Figure 17C:
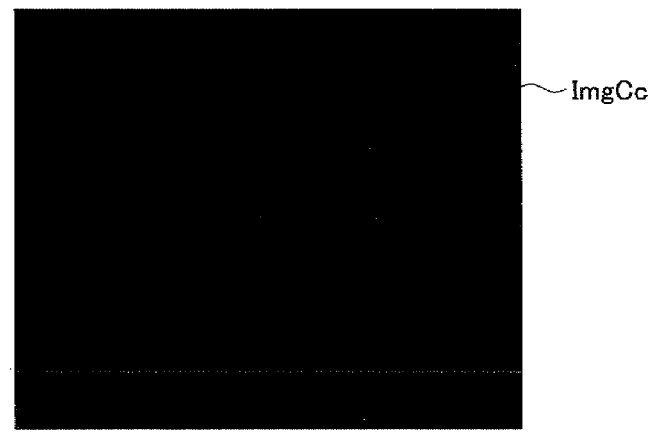
Figure 18:
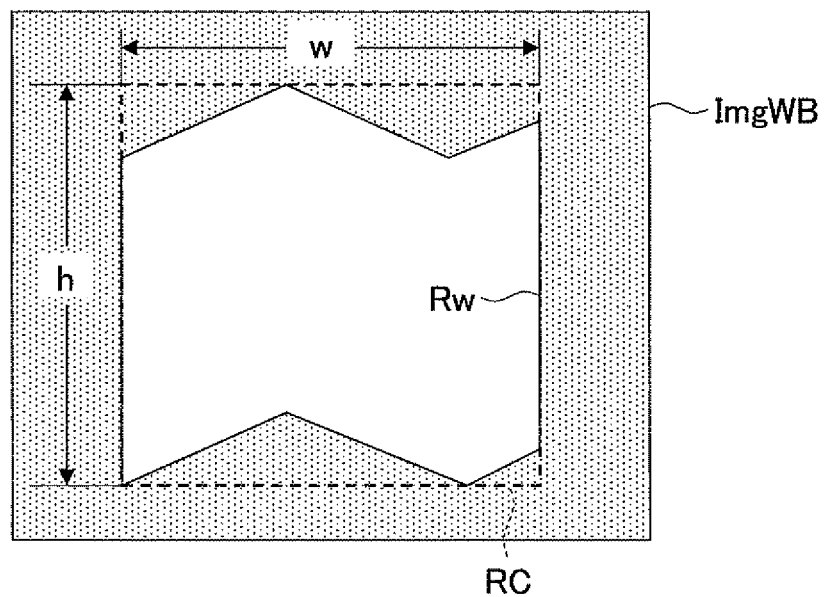
FIG. 18 is an illustration diagram illustrating calculation of a differential image and a circumscribed rectangle for an image processing device according to a second embodiment.

Specifically, it is possible for the image processing device to project white light onto a projection object Scr by using a projecting part 410 as illustrated in, for example, FIG. 17A. Furthermore, it is possible for the image processing device to capture an image of an area including a projection object Scr (or capture camera image data ImgCb) by using an image capturing part 420 as illustrated in, for example, FIG. 17B.

Then, the image processing device goes to step S1602.

At step S1602, the image processing device projects black light (for example, a solid black image stored in an image-for-calibration storing part) by using a projecting part. Furthermore, the image processing device captures an image of a projection object on which black light has been projected, by using an image capturing part.

Specifically, it is possible for the image processing device to conduct projection, similarly to step S1601, as illustrated in, for example, FIG. 17A. Furthermore, it is possible for the image processing device to capture an image of an area including a projection object Scr (or capture camera image data ImgCc) by using an image capturing device 420 as illustrated in, for example, FIG. 17C. Additionally, the image processing device may conduct a step of capturing an image of an area including a projection object Scr without projecting projection light onto a projection object.

Then, the image processing device goes to step S1603.

At step S1603, the image processing device calculates a brightness difference to produce a differential image by using a binary image producing part. Specifically, a binary image producing part, first, calculates a brightness value Iw (x, y) at a pixel position (a, y) in an image captured when ahite light is projected (at step S1601). Furthermore, a binary image producing part calculates a brightness value Ib (x, y) at a pixel position (x, y) in an image captured when black light is projected (at step S1602). Then, a binary image producing part calculates a difference D (x, y) between brightness values and produces a differential image ImgWB (FIG. 18) based on a calculated difference D (x, y).

Additionally, a binary image producing part may calculate a difference D (x, y) between brightness values by using numerical formula 5. Furthermore, a binary image producing part may produce a differential image ImgW by using a difference between brightness values at each pixel. Moreover, a binary image producing part may produce a differential image ImgWB by using an absolute value of a difference between brightness values at each pixel.

Then, the image processing device goes to step S1604.

At step S1604, the image processing device calculates a circumscribed rectangle by using a binary image producing part. It is possible for a binary image producing part to calculate a circumscribed rectangle Rc which is circumscribed with an area Rw calculated by using a difference D between brightness values, as illustrated in, for example, FIG. 18. It is possible for a binary image producing part to calculate, for example, a circumscribed rectangle Rc having one side with a length or width of w and another side with a length or height of h. Additionally, a binary image producing part may sample a pixel with an absolute value of a calculated difference which is greater than a predetermined value and calculate a rectangle circumscribed with an area (for example, an irregularity) including a sampled pixel. Herein, it is possible for a predetermined value to be a value predetermined by using a numerical calculation or an experiment, etc.

Then, the image processing device goes to step S1605.

At step S1605, the image processing device calculates a size of a block for dividing a calculated circumscribed rectangle by using a binary image producing part. Specifically, it is possible for a binary image producing part to provide a size of a block which is a value bk represented by the following formula:

$$bk > \mathrm{MAX}(w/2m, h/2n).$$

That is, a binary image producing part calculates a size in such a manner that it is possible to divide a circumscribed rectangle into blocks with a width greater than a width of a stripe of a projected grey code pattern.

Herein, m is the number of (a pair(s) of) a stripe(s) (for example, FIG. 19A) of a grey code pattern with a vertical stripe stored in an image-for-calibration storing part 142 of a storage part 140 (FIG. 1) wherein a width of a pattern is smallest. n is the number of (a pair(s) of) a stripe(s) (for example, FIG. 19B) of a grey code pattern with a horizontal stripe stored in a storage part 140 wherein a width of a pattern is smallest.

Figure 19A:
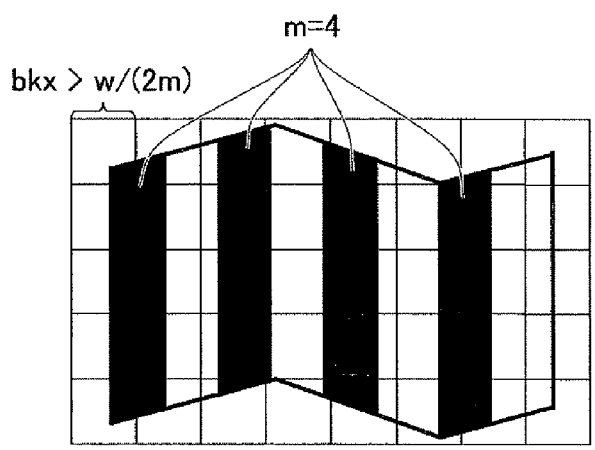
FIGS. 19A, 19B, and 19C are illustration diagrams illustrating calculation of a block size and common use of a threshold in an image processing device according to a second embodiment.
Figure 19B:
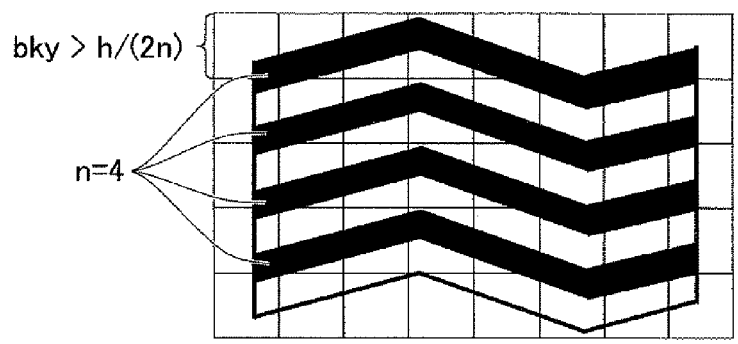
Figure 19C:
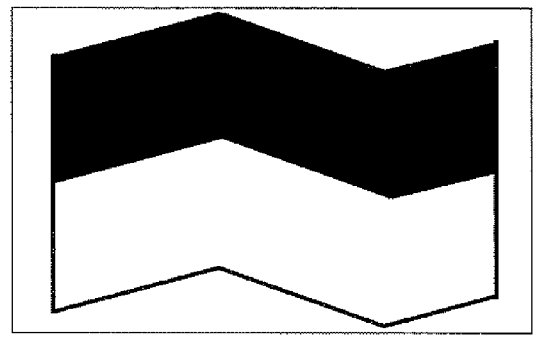

Additionally, as illustrated in FIGS. 19A, 19B, and 19C, sizes of blocks may not be an identical size between a horizontal one and a vertical one. Furthermore, sizes of blocks, for example, bkx in FIG. 19A and bky in FIG. 19B, may not be the same size. That is, a rectangular shape with bkx and bky may be provided in such a manner that sizes of blocks satisfies, for example, bkx>w/2m and bky>h/2n. Moreover, it is preferable for a size of a block to be about 1.5 times w/2m or h/2n (a lower limit).

As its calculation is completed, the image processing device goes to step S1606.

Then, at step S1606, the image processing device stores a size of a calculated block by using a storage part.

Then, the image processing device goes to step S401 in FIG. 4.

At step S401 to step S406 in FIG. 4, the image processing device divides a captured grey code image into blocks and calculates a threshold for binarization, similarly to the image processing device according to the first embodiment. Herein, it is possible for the image processing device in the present embodiment to divide a grey code image by using a block with a size calculated at step S1605.

Then, the image processing device goes to step S407.

At step S407, the image processing device produces a binary image from a grey code image captured at step S403 by using a binary image producing part and using a threshold calculated at step S405, similarly to the image processing device according to the first embodiment. Herein, it is possible for an image processing device according to the present embodiment to use a threshold for binarization calculated by using a grey code having a stripe with a smallest width, for binarization of a grey code image captured by using another grey code having a stripe with a large width. It is possible for the image processing device to use a threshold for binarization calculated by using, for example, FIGS. 19A and 19B, for binarization of a grey code image in FIG. 19C.

Thereby, it is possible for an image processing device according to the present embodiment to prevent a deficiency in production of a binary image which may be caused in a case where a size of a block is small. Moreover, it is possible for an image processing device according to the present embodiment to use a threshold for binarization calculated by using a grey code having a stripe with a smallest width, whereby it is possible to improve a characteristic for following a change of brightness inside a projection area. That is, it is possible for the image processing device to produce a binary image provided by following a variation of brightness of an image more accurately. Then, the image processing device goes to step S408.

At step S408 and step S409, the image processing device produces binary images corresponding to all of grey code patterns, by using a binary image producing part, similarly to the image processing device according to the first embodiment.

As production of binary images is completed, the image processing device goes to "END" in FIG. 4 and ends an operation for binarizing an image. Otherwise, the image processing device goes to step S409, and repeats operations at step 407 and step 408 until production of all of binary images is completed.

Figure 20:
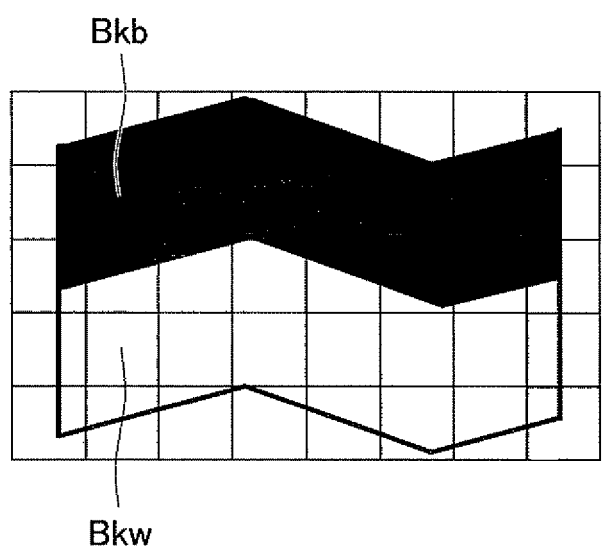
FIG. 20 is an illustration diagram illustrating an example of an image to be captured when a coarse grey code pattern is projected.

On the other hand, when a size bk of a block calculated at step S1605 is a size less than w/2m or h/2n, an entire area inside a block may be white or black (for example, Bkb or Bkw in FIG. 20). When a discrimination analysis is used for calculation of a threshold for binarization, a binary image producing part calculates a threshold by using a pixel in a block even if an entire area inside a block is black, and hence, about a half area inside a block may be binarized as a white area (for example, a patch shape). That is, when a size bk of a block is a size less than w/2m or h/2n, it may not be possible for a binary image producing part to produce a binary image as provided by following a variation of brightness of an image accurately, when a grey code image is binarized (at step S407).

Furthermore, when a size bk of a block calculated at step S1605 is approximately equal to w/2m or h/2n, a width of a stripe of a grey code image may be greater than a size bk of a block depending on a condition (a curved surface, a distortion, a deformation, etc.) of a projection object. Hence, it may not be possible for a binary image producing part to produce a binary image provided by following a variation of brightness of an image accurately.

As described above, according to an image processing device (or a binary image producing part) according to a second embodiment of the present invention, it is possible to calculate a circumscribed rectangle Rc by using a difference between brightness values, whereby it is possible to calculate a size bk (bkx, bky) of a block by using a calculated circumscribed rectangle Rc.

Furthermore, according to an image processing device according to the present embodiment, it is possible to calculate a threshold for binarization (a first threshold T1) for each block by using a calculated block size bk, whereby it is possible to produce a binary image without being influenced by interior illumination, etc. Furthermore, according to an image processing device according to the present embodiment, it is possible to calculate a threshold (second threshold T2) corresponding to each pixel (second divided area Px) in a block by using a calculated block size bk, whereby it is possible to produce a binary image without being influenced by interior illumination, etc. That is, according to an image processing device according to the present embodiment, it is possible to produce a binary image, even when interior illumination turns on or when there is a local irregularity on a surface of a projection object.

Moreover, according to an image processing device according to the present embodiment, it is possible to use a threshold for binarization calculated based on a grey code image having a stripe with a small width, for another grey code image, whereby it is possible to prevent a deficiency in production of a binary image which may be caused in a case where a size of a block is small. Furthermore, according to an image processing device according to the present embodiment, it is possible to improve a characteristic for following a change of brightness inside a projection area, because it is possible to use a threshold for binarization calculated based on a grey code image having a stripe with a small width, for another grey code image. That is, it is possible for an image processing device according to the present embodiment to produce a binary image provided by following a variation of brightness of an image.

(Corresponding Point Sampling Operation) and (Information-for-Correction Calculating Operation)

FIGS. 7A, 7B, 7C, 7D, 7E, 7F, 7G, and 7H, FIGS. 8A and 8B, FIG. 9, and FIGS. 10A, 10B, and 10C illustrate an operation for sampling a corresponding point and an operation for calculating information for correction. Additionally, a corresponding point sampling operation, etc., of the image processing device 400 according to the present embodiment are basically similar to a corresponding point sampling operation, etc., of the aforementioned image processing device 100 according to the first embodiment, and hence, their descriptions will be omitted.

(Program and Program-Recorded Recording Medium)

A program Pr according to an embodiment of the present invention executes a step of projecting a first image for calibration onto a projection object, a step of capturing an image of an area including such a projection object on which the first image for calibration has been projected, a step of calculating plural first thresholds corresponding to plural first divided areas provided by dividing the area based on such a captured image, a step of projecting a second image for calibration onto a projection object, a step of capturing an image of an area including such a projection object on which the second image for calibration has been projected, a step of producing a binary image of an image provided by capturing an image of an area including such a projection object on which the first image for calibration and the second image for calibration have been projected, based on the first thresholds, and a step of sampling corresponding points between the first image for calibration and second image for calibration and the binary image. According to such a configuration, it is possible to obtain an effect comparable with those of image processing devices according to the first embodiment and second embodiment of the present invention. Furthermore, it is possible for the step of producing a binary image to further include a step of calculating plural second thresholds corresponding to plural second divided areas provided by dividing the first divided areas based on the first thresholds. Moreover, it is possible for the step of producing a binary image to include a step of calculating a dispersion value or edge intensity of a pixel value of such a captured image and calculating the first thresholds based on such a calculated dispersion value or edge intensity.

Furthermore, an embodiment of the present invention may be a computer-readable recording medium Md on which the program Pr has been recorded. For a recording medium Md on which the program Pr has been recorded, it is possible to utilize a flexible disk, a CD-ROM, a DVD, a memory card, or another computer-readable medium.

Next, an embodiment of the present invention will be described by using a practical example of an image projecting device and an image projecting system.

Additionally, it is possible to use an embodiment of the present invention to any one (part, device, system, etc.) other than an image projecting device, etc., described below, as long as an area of a captured image of an object is divided and a threshold for binarization corresponding to a divided area is calculated, whereby information for correction of a projected image is calculated.

Practical Example 1

An embodiment of the present invention will be described by using an image projecting device according to Practical example 1.

(Configuration of an Image Projecting Device)

FIG. 1 illustrates a configuration of an image projecting device 200 according to the present practical example. A configuration of the image projecting device 200 is basically similar to a configuration of the image processing device according to the first embodiment, and hence, its description(s) will be omitted.

(Image Projecting Operation)

Figure 11:
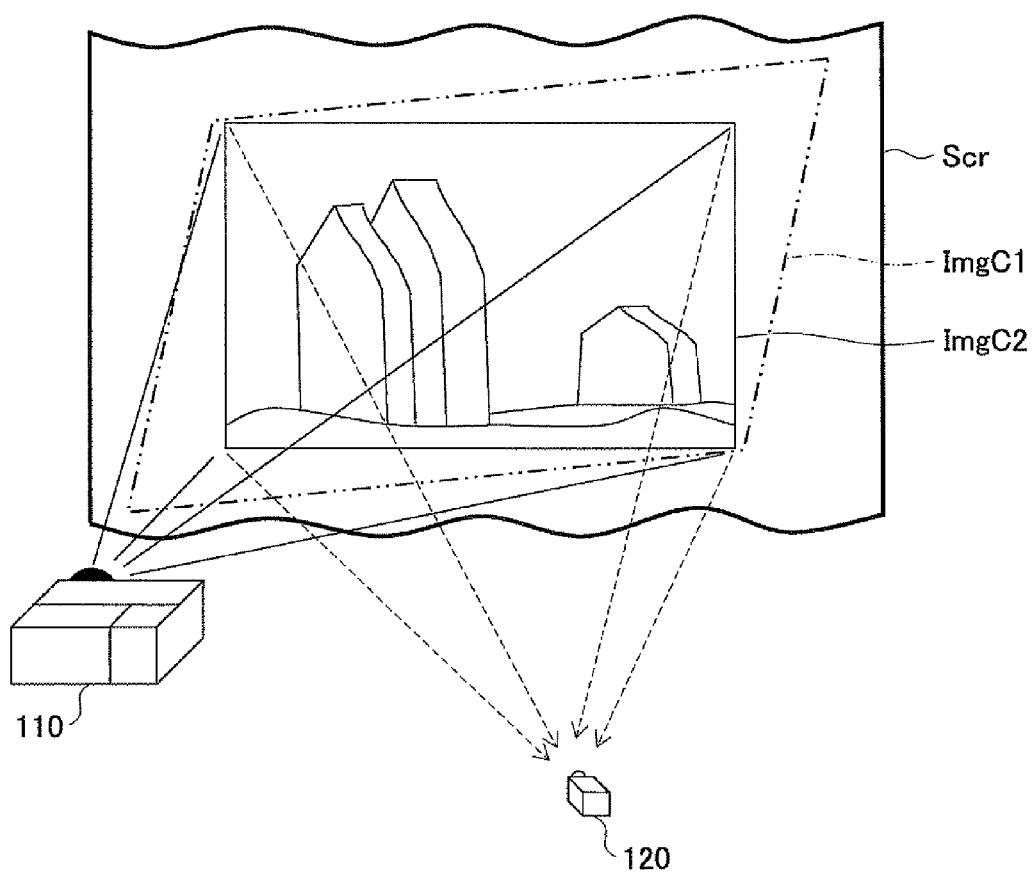
FIG. 11 is an illustration diagram illustrating a projecting operation of an image projecting device according to Practical example 1.
Figure 12:
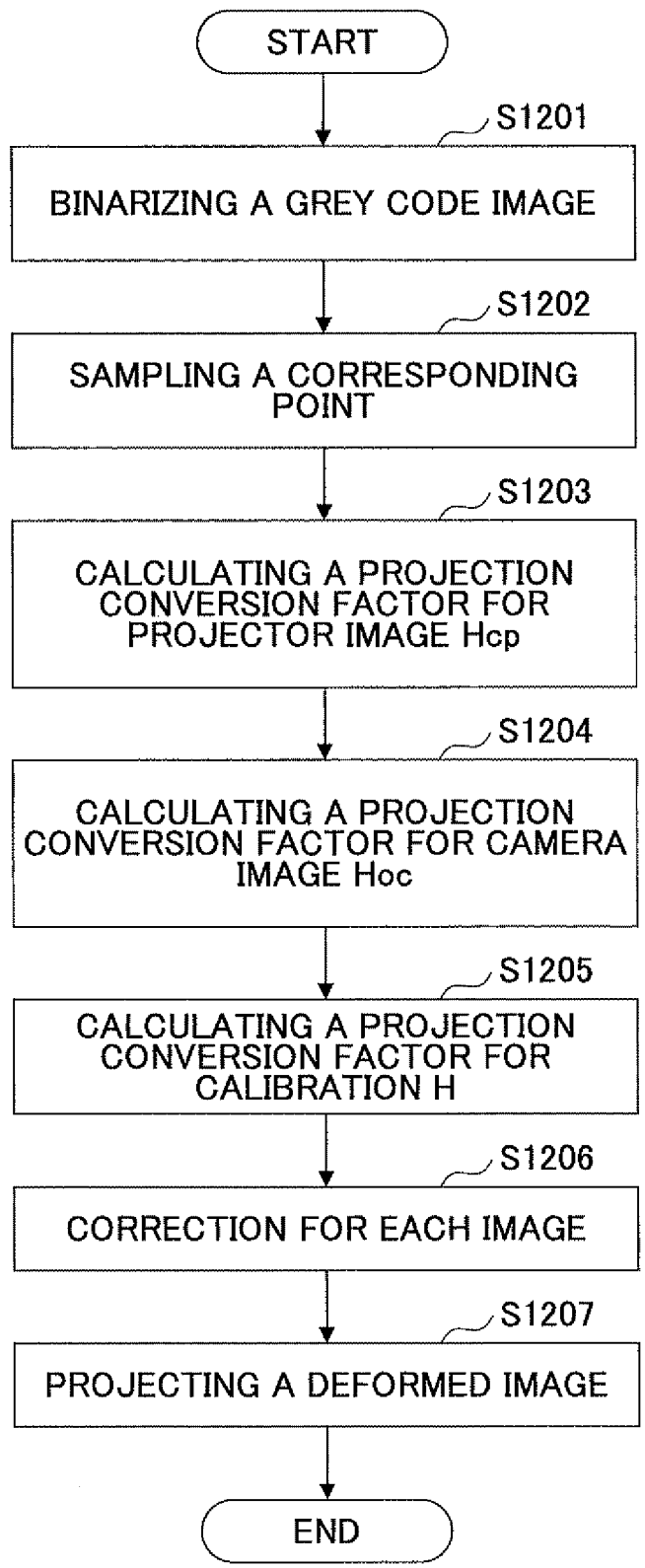
FIG. 12 is a flow chart diagram illustrating projecting operations of an image projecting device according to Practical example 1.
Figure 13A:
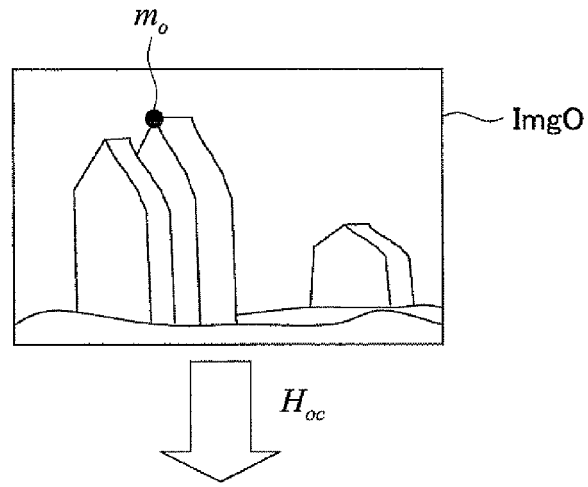
FIGS. 13A, 13B, and 13C are illustration diagrams illustrating correction of an image in an image projecting device according to Practical example 1.
Figure 13B:
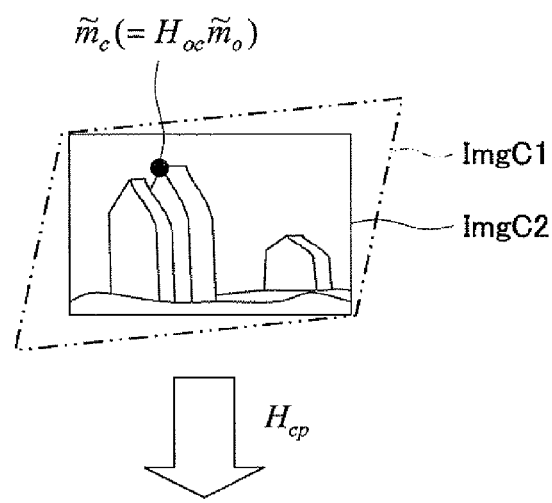
Figure 13C:
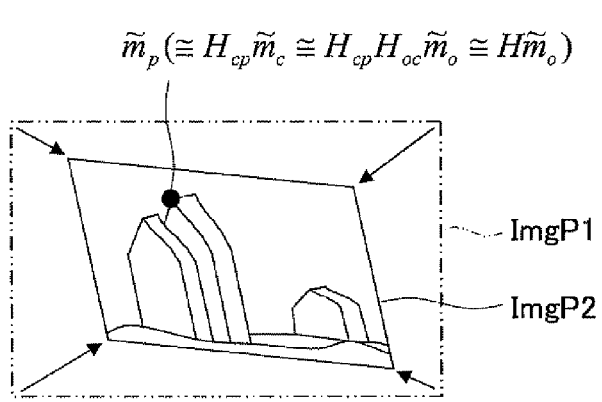

An operation for projecting an image will be described by using FIG. 11, FIG. 12, and FIGS. 13A, 13B, and 13C. FIG. 11 is a diagram illustrating an operation for projecting an image onto a projection object and capturing an image of an area including a projection object on which an image has been projected. FIG. 12 is a flow chart diagram illustrating an operation for projecting an image. FIGS. 13A, 13B, and 13C are diagrams illustrating correction of an image to be projected.

As illustrated in FIG. 11, a projecting part 110 projects an image or grey code pattern stored in an image-for-projection storing part or image-for-calibration storing part, as an image to be projected (projector image data ImgP) onto a projection object Scr. Then, an image capturing part 120 captures an image of reflected light (camera image data ImgC) from an area including the projection object Scr on which an image has been projected. Herein, the projecting part 110 is close to the projection object Scr. Accordingly, a trapezoidal distortion, etc. occurs on a projected image (ImgC1 in FIG. 11). The image projecting device in the present practical example corrects a trapezoidal distortion, etc., by using a projective conversion factor described below and projects a corrected image (for example, ImgC2 in FIG. 11) onto the projection object.

Then, the procedure of an operation for projecting an image will be described by using FIG. 12.

As illustrated in FIG. 12, the image projecting device, first, produces a binary image from a grey code image captured by the image capturing part (step S1201). An operation for producing a binary image is similar to an image binarizing operation in the above-mentioned embodiment, and its description(s) will be omitted. As an operation for producing a binary image is completed, the image projecting device goes to step S1202.

At step S1202, the image projecting device samples a corresponding point in a produced binary image by using a corresponding point sampling part. An operation for sampling a corresponding point is similar to a corresponding point sampling operation in the above-mentioned embodiment, and hence, its description(s) will be omitted. As sampling of a corresponding point is completed, the image projecting device goes to step S1203.

At step S1203, the image projecting device calculates a projective conversion factor for projector image Hcp based on a produced binary image and a sampled corresponding point by using a conversion factor calculating part. An operation for calculating a projective conversion factor for projector image Hcp is similar to an information-for-correction calculating operation in the above-mentioned embodiment, and hence, its description(s) will be omitted. As calculation of a projective conversion factor for projector image Hcp is completed, the image projecting device goes to step S1204.

At step S1204, the image projecting device calculates a projective conversion factor for camera image Hoc based on a produced binary image and a sampled corresponding point by using the conversion factor calculating part. An operation for calculating a projective conversion factor for camera image Hoc is similar to an information-for-correction calculating operation in the above-mentioned embodiment, and hence, its description(s) will be omitted. As calculation of a projective conversion factor for camera image Hoc is completed, the image projecting device goes to step S1205.

At step S1205, the image projecting device calculates a projective conversion factor for calibration H based on a projective conversion factor for projector image Hcp and a projective conversion factor for camera image Hoc by using the conversion factor calculating part. An operation for calculating a projective conversion factor for calibration H is similar to an information-for-correction calculating operation in the above-mentioned embodiment, and hence, its description(s) will be omitted. As calculation of a projective conversion factor for calibration H is completed, the image projecting device goes to step S1206.

At step S1206, the image projecting device corrects an image for projection based on a projective conversion factor for calibration H. Specifically, the image projecting device corrects (or deforms) an image for original image data ImgO based on an inverse matrix of a calculated projective conversion factor for calibration H and produces an image for projector image data imgP on which a trapezoidal distortion, etc., is eliminated.

Herein, FIG. 13A provides an image for original image data ImgO. FIG. 13B provides an image for camera image data ImgC. FIG. 13C provides an image for projector image data ImgP. Furthermore, an image ofr original image data ImgO in FIG. 13A is subjected to a projective conversion by using a projective conversion factor for camera image Hoc to provide an image for camera image data ImgC1 in FIG. 13B. Camera image data ImgC2 in FIG. 13B is subjected to a projective conversion by using a projective conversion factor for projector image Hcp to provide an image for projector image data imgP2 in FIG. 13C.

The image projecting device subjects an image for original image data ImgO (for example, FIG. 13A) to a projective conversion based on an inverse matrix of a calculated projective conversion factor for calibration H (=Hoc·Hcp) and calculates an image for projector image data ImgP2 (for example, FIG. 13C) on which a trapezoidal distortion, etc., are eliminated. An image for camera image data ImgC when such projector image data ImgP2 after projective conversion is projected is an image for camera image data ImgC2 (for example, FIG. 13B). That is, when a projection object is viewed from a direction of a front face, a projected image (projector image data ImgP2) is an image on which a trapezoidal distortion is eliminated (camera image data ImgC2).

For a method of a projective conversion, it is possible to use a method of calculating pixel values of four pixels surrounding a pixel to be converted on an image for original image data ImgO and obtaining a pixel value on an image for projector image data ImgP2 by a bilinear method. Furthermore, it is possible to use a method of calculating pixel values of surrounding sixteen pixels and obtaining a pixel value on an image for projector image data imgP2 by bicubic method. Moreover, it is possible to use a method of obtaining a pixel value by a nearest-neighbor method in which a corresponding pixel value on an image for original image data ImgO is used for a pixel value for projector image data ImgP2.

Additionally, an image quality after a projective conversion degrades in order of bicubic, bilinear, and nearest-neighbor methods. A processing time is provided in a reverse order thereof. Accordingly, the image projecting device may selects a method of a projective conversion depending on an image quality or an image processing time.

As correction of an image for projection is completed, the image projecting device goes to step S1207.

Then, at step S1207, the image projecting device projects an image for projection (for example, ImgP2 in FIG. 13C) corrected at step S1206. Then, the image projecting device goes to "END" in the figure and ends an operation for projecting an image.

As described above, according to the image projecting device 200 according to Practical example 1 in an embodiment of the present invention, it is possible to obtain an effect comparable with that of an image processing device according to the first embodiment or second embodiment of the present invention. That is, according to the image projecting device 200 according to the present practical example, it is possible to calculate a projective conversion factor based on a binary image converted by using a threshold corresponding to each block and each pixel, whereby it is possible to project an image with no trapezoidal distortion, etc., by using a calculated projective conversion factor. Furthermore, according to the image projecting device 200 according to the present practical example, it is possible to project an image with no trapezoidal distortion, etc., without being influenced by interior illumination, etc., because it is possible to calculate a projective conversion factor based on a binary image converted by a threshold corresponding to each block and each pixel. Moreover, according to the image projecting device 200 according to the present practical example, it is possible to project an image with no trapezoidal distortion, etc., by using a calculated projective conversion factor, even when interior illumination turns on or when there is a local irregularity on a surface of a projection object, etc.

Variation Example

An image projecting device which calculates a threshold for binarization for each block based on an edge intensity will be described by using a variation example of Practical example 1.

(Configuration of an Image Projecting Device)

A configuration of an image projecting devoice according to the present variation example is similar to a configuration in Practical example 1 (FIG. 1), and hence, its description(s) will be omitted.

(Image Projecting Operation)

The image projecting device according to the present variation example calculates a threshold for binarization for each block based on an edge intensity. Specifically, the image projecting device, first, calculates an edge intensity for each pixel in a block. Then, the image projecting device samples a pixel with a predetermined or greater edge intensity and an average of pixel values of sampled pixels is provided as a threshold.

Herein, it is possible to calculate an edge intensity by using a spatial filter represented by numerical formula 10:

$$\begin{pmatrix} -1 & -1 & -1 \\ -1 & 8 & -1 \\ -1 & -1 & -1 \end{pmatrix}.$$

Additionally, it is possible to predetermine a predetermined edge intensity by a numerical calculation or an experiment, etc.

An operation for sampling a corresponding point, an operation for calculating a projective conversion factor, and an operation for projecting a corrected image are similar to operations in Practical example 1, and hence, their descriptions will be omitted.

Practical Example 2

Figure 14:
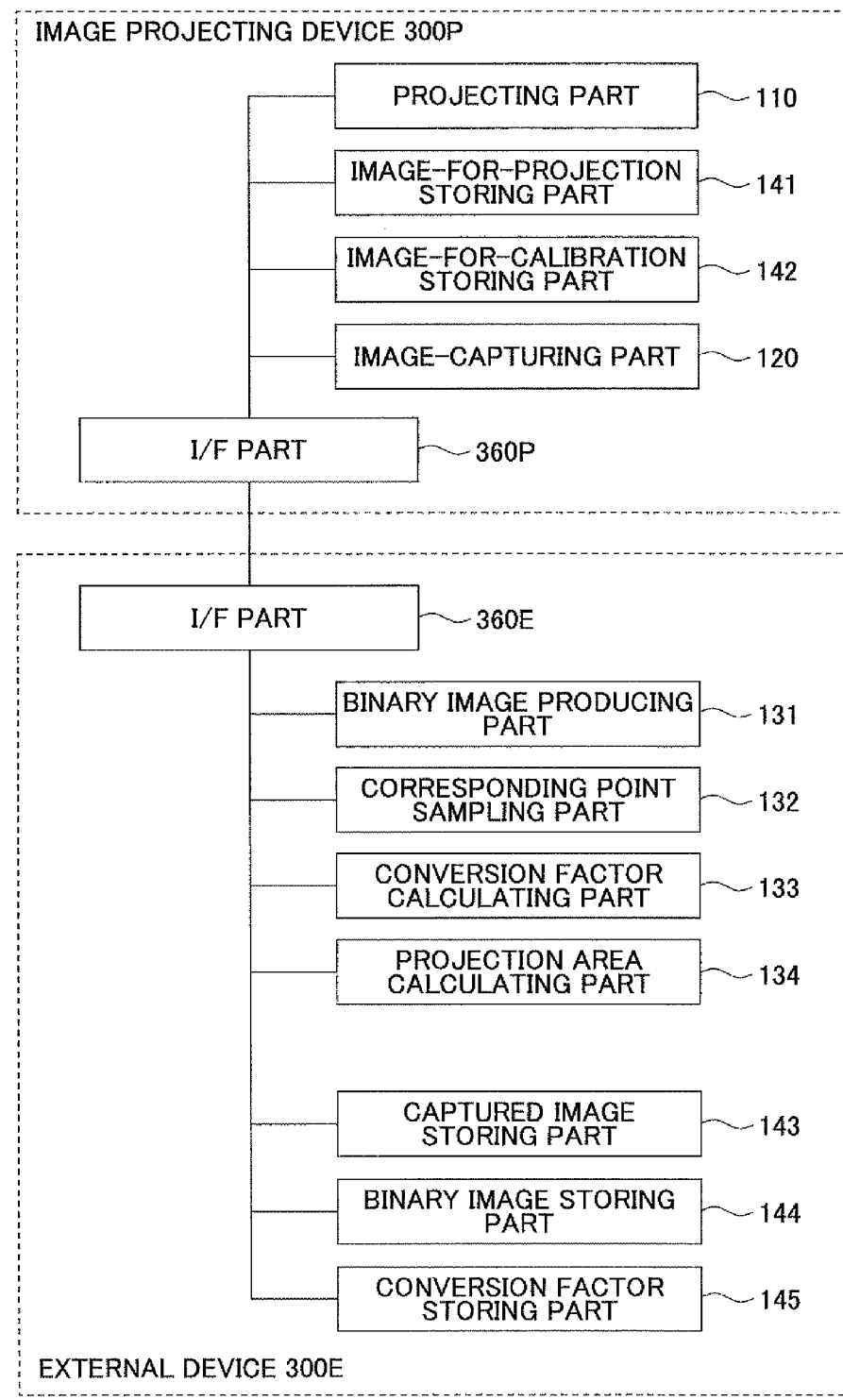
FIG. 14 is a schematic system configuration diagram illustrating one example of an image projecting system according to Practical example 2.
Figure 15:
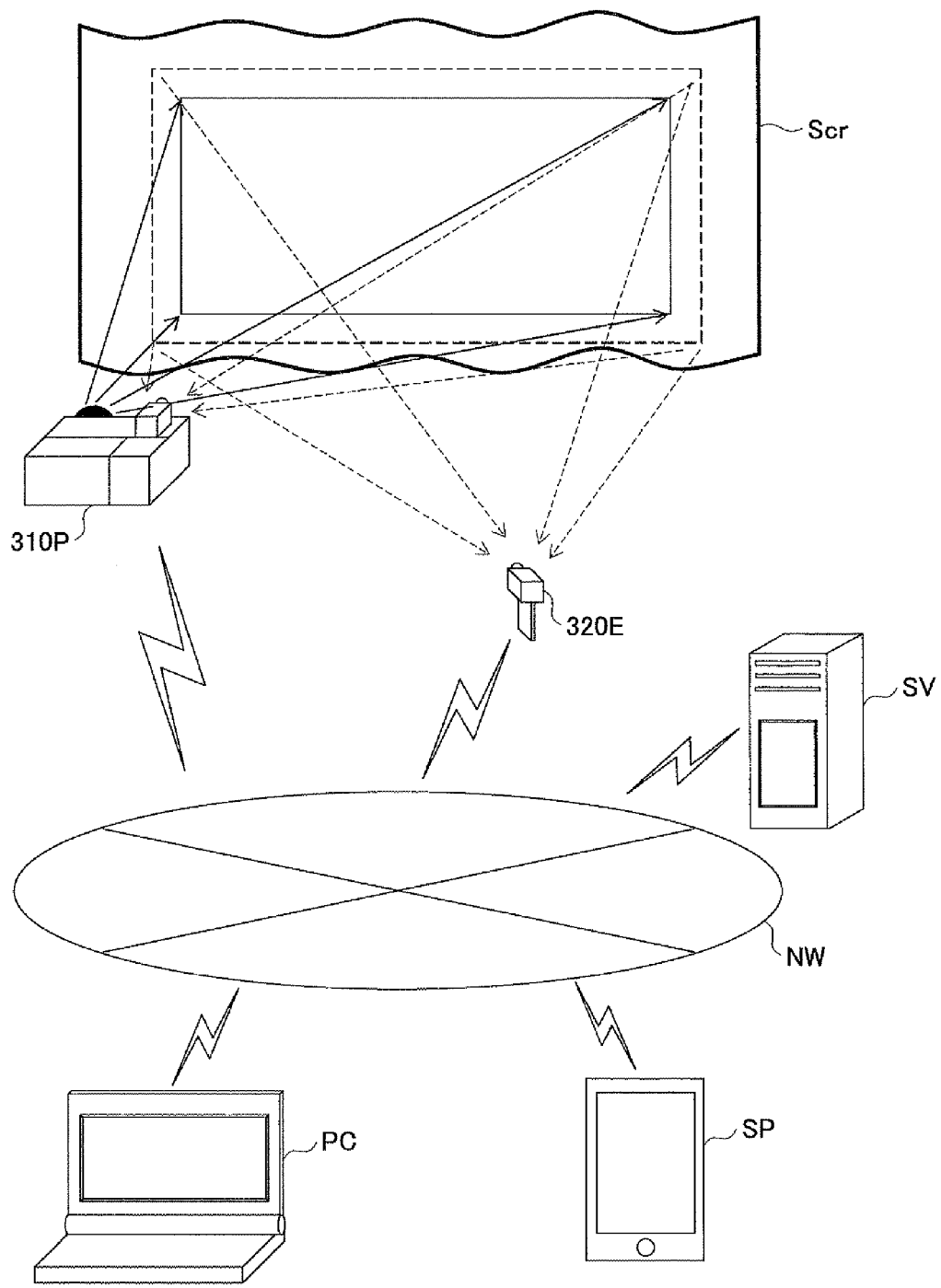
FIG. 15 is an illustration diagram illustrating a projecting operation of an image projecting system according to Practical example 2.

An image projecting system according to Practical example 2 in an embodiment of the present invention will be described by using FIG. 14 and FIG. 15. FIG. 14 is an example of a schematic configuration diagram of an image projecting system 300 according to the present practical example. FIG. 15 is a diagram illustrating a projecting operation of an image projecting system 300 according to the present practical example.

(Configuration of an Image Projecting System)

As illustrated in FIG. 14, the image projecting system 300 includes an image projecting device 300P and an external device 300E. Herein, a component with the same symbol as that of Practical example 1 is basically similar to a component of Practical example 1, and hence, its description(s) will be omitted.

The image projecting device 300P includes an I/F part 360P as a communication part. Furthermore, the external device 300E includes an I/F part 360E. It is possible for the image projecting device 300P and the external device 300E to conduct a wired and/or wireless communication with each other by using the I/F parts 360P and 360E. For the external device 300E, it is possible to utilize a cloud computer, etc.

The external device 300E includes a binary image producing part 131, a corresponding point sampling part 132, a conversion factor calculating part 133, a projection area calculating part 134, a captured image storing part 143, a binary image storing part 144, and a conversion factor storing part 145. In the present practical example, it is possible for the external device 300E to conduct a process of an operation for calculating information for correcting an image based on information outputted from the image projecting device 300P. Furthermore, it is possible for the external device 300E to correct an image to be projected based on information for correction and output data for a corrected image to the image projecting device 300P (or an image-for-projection storing part 141). Herein, the external device 300E may have a configuration including at least one part among the binary image producing part 131, etc.

(Image Projecting Operation)

An image projecting operation of the image projecting system 300 will be described by using FIG. 15. A basic operation of the image projecting system 300 is similar to that of Practical example 1, and hence, a different matter(s) will be described principally.

As illustrated in FIG. 15, the image projecting system 300 in the present practical example conducts image capturing of a projection object Scr and image processing of a captured image outside the image projecting device 310P. Specifically, the image projecting system 300 outputs an instruction for projecting an image for calibration and an image for projection from an external device (PC or SP, etc.) through a network NW, etc., to a projecting part 310P (projector, etc.). Furthermore, the image projecting system 300 conducts image capturing of a projection object by a camera 320E connected to a PC, etc. Moreover, the image projecting system 300 conduct image processing (production of a binary image, sampling of a corresponding point, calculation of information for correcting an image, and correction of an image for projection, etc.) of an image captured by the camera 320E by using an external device (PC or SP, etc.).

As described above, it is possible for the image projecting system 300 to reduce workload on the image projecting device 300P (FIG. 14) by using the external device 300E (FIG. 14) whereby it is possible to reduce a size and weight of and simplify an image projecting device. Furthermore, it is possible for the image projecting system 300 to utilize a PC, etc., as an external device. Accordingly, when presentation, etc., is conducted by using an image projecting device (projector, etc.), it is possible for the image projecting system 300 to utilize a PC, etc., used at time of presentation, as an external device (and an image capturing part or photographing part). Moreover, it is possible for the image projecting system 300 to have a configuration such that an external device includes another part (an image-for-projection storing part of an image projecting device, etc.).

The present invention is not limited to any of an image projecting device, an image processing device, and an image projecting system, etc., in the above-mentioned embodiments and practical examples, but it is possible to conduct modification such as addition, modification, or deletion of a component in the scope which could be conceived by a person skilled in the art and any aspect thereof is included in the scope of the present invention.

APPENDIX

An Illustrative Embodiment(s) of an Image Projecting Device, an Image Processing Device, an Image Projecting Method, a Program for an Image Projecting Method, and a Recording Medium on which Such a Program is Recorded At least one illustrative embodiment of the present invention may relate to an image projecting device, an image processing device, an image projecting method, a program for an image projecting method, and a recording medium on which such a program is recorded.

An object of at least one illustrative embodiment of the present invention may be to provide an image projecting device capable of binarizing a captured image and capable of calculating information for correction of an image, even when interior illumination turns on or when there is a local irregularity on a surface of a projection object, etc.

In order to achieve an object as described above, an illustrative embodiment of the present invention may provide an image projecting device characterized by including a projecting part for projecting an image for calibration onto a projection object, an image capturing part for capturing an image of an area including the projection object on which the image for calibration is projected, a binary image producing part for calculating plural first thresholds corresponding to plural first divided areas provided by dividing the area, based on a captured image, and for producing a binary image of the captured image, based on the first thresholds, and a corresponding point sampling part for sampling corresponding points between the image for calibration and the binary image.

Illustrative embodiment (1) is an image projecting device characterized by including a projecting part for projecting an image for calibration onto a projection object, an image capturing part for capturing an image of an area including the projection object on which the image for calibration is projected, a binary image producing part for calculating plural first thresholds corresponding to plural first divided areas provided by dividing the area, based on a captured image, and for producing a binary image of the captured image, based on the first thresholds, and a corresponding point sampling part for sampling corresponding points between the image for calibration and the binary image.

Illustrative embodiment (2) is the image projecting device as described in illustrative embodiment (1), characterized in that the binary image producing part calculates plural second thresholds corresponding to plural second divided areas provided by dividing the first divided areas, based on the first thresholds.

Illustrative embodiment (3) is the image projecting device as described in illustrative embodiment (1) or (2), characterized in that the binary image producing part calculates a value of dispersion of pixel values of the captured image and calculates the first thresholds, based on a calculated value of dispersion.

Illustrative embodiment (4) is the image projecting device as described in any one of illustrative embodiments (1) to (3), characterized in that the binary image producing part calculates an edge intensity of the captured image and calculates the first thresholds based on a calculated edge intensity.

Illustrative embodiment (5) is an image processing device characterized by including a projecting part for projecting plural images for calibration onto a projection object, an image capturing part for capturing images of an area including the projection object on which the plural images for calibration are projected, a binary image producing part for calculating plural first thresholds corresponding to plural first divided areas provided by dividing the area based on captured plural images, calculating plural second thresholds corresponding to plural second divided areas provided by further dividing the first divided areas using calculated first thresholds, and producing binary images of captured images based on the calculated first thresholds and second thresholds, and a corresponding point sampling part for sampling corresponding points between the images for calibration and the binary images, wherein the binary image producing part calculates the first thresholds and the second thresholds using one image among the captured plural images and produces a binary image of another image among the plural images using the calculated first thresholds and second thresholds.

Illustrative embodiment (6) is the image processing device as described in illustrative embodiment (5), characterized in that the projecting part projects a white solid image and a black solid image among the plural images for calibration, the image capturing part captures each of images of areas including the projection object on which the white solid image and the black solid image are projected, and the binary image producing part calculates a size(s) of the first divided areas using an image of an area on which the captured white solid image is projected and an image of an area on which the captured black solid image is projected.

Illustrative embodiment (7) is an image projecting method characterized by including a step of projecting a first image for calibration onto a projection object, a step of capturing an image of an area including the projection object on which the first image for calibration is projected, a step of calculating plural first thresholds corresponding to plural first divided areas provided by dividing the area based on a captured image, a step of projecting a second image for calibration onto a projection object, a step of capturing an image of an area including the projection object on which the second image for calibration is projected, a step of producing binary images of images provided by capturing images of areas including the projection object(s) on which the first image for calibration and the second image for calibration are projected, based on the first thresholds, and a step of sampling corresponding points between the first image for calibration and second image for calibration and the binary images.

Illustrative embodiment (8) is the image projecting method as described in illustrative embodiment (7), characterized in that the step of producing binary images further includes a step of calculating plural second thresholds corresponding to plural second divided areas provided by dividing the first divided areas based on the first thresholds.

Illustrative embodiment (9) is the image projecting method as described in illustrative embodiment (7) or (8), characterized in that the step of producing binary images includes a step of calculating a value of dispersion of pixel values of the captured image and calculating the first thresholds based on a calculated value of dispersion.

Illustrative embodiment (10) is the image projecting method as described in any one of illustrative embodiments (7) to (9), characterized in that the step of producing binary images includes a step of calculating an edge intensity of the captured image and calculating the first thresholds based on a calculated edge intensity.

Illustrative embodiment (11) is a program for causing a computer to execute the image projecting method as described in any one of illustrative embodiments (7) to (10).

Illustrative embodiment (12) is a computer-readable recording medium on which the program as described in illustrative embodiment (11) is recorded.

According to at least one illustrative embodiment of the present invention, it may be possible to capture an image of an area including a projection object on which an image is projected, divide a captured image of an area, and calculate a binarization threshold corresponding to a divided area, whereby it may be possible to calculate information for correction of an image to be projected.

Although the illustrative embodiment(s) and specific example(s) of the present invention have been described with reference to the accompanying drawings, the present invention is not limited to any of the illustrative embodiment(s) and specific example(s) and the illustrative embodiment(s) and specific example(s) may be altered, modified, or combined without departing from the scope of the present invention.

The present application claims the benefit of its priority based on Japanese Patent Application No. 2011-190819 filed on Sep. 1, 2011 and Japanese Patent Application No. 2012-127398 filed on Jun. 4, 2012, the entire contents of which are hereby incorporated by reference herein.

What is claimed is:

1. An image projecting device, comprising:
    a projecting part configured to project an image for calibration onto a projection object;
    an image capturing part configured to capture an image of an area including the projection object with a projected image for calibration;
    a binary image producing part configured to calculate plural first thresholds corresponding to plural first divided areas provided by dividing the area, based on a captured image, and to produce a binary image of the captured image, based on the first thresholds; and
    a corresponding point sampling part configured to sample corresponding points between the image for calibration and the binary image.

2. The image projecting device as claimed in claim 1, wherein the binary image producing part is configured to calculate plural second thresholds corresponding to plural second divided areas provided by dividing the first divided areas, based on the first thresholds.

3. The image projecting device as claimed in claim 1, wherein the binary image producing part is configured to calculate a value of dispersion of pixel values of the captured image and calculate the first thresholds, based on a calculated value of dispersion.

4. The image projecting device as claimed in claim 1, wherein the binary image producing part is configured to calculate an edge intensity of the captured image and calculate the first thresholds based on a calculated edge intensity.

5. An image processing device, comprising:
    a projecting part configured to project plural images for calibration onto a projection object;
    an image capturing part configured to capture images of an area including the projection object with plural projected images for calibration;
    a binary image producing part configured to calculate plural first thresholds corresponding to plural first divided areas provided by dividing the area based on captured plural images, calculate plural second thresholds corresponding to plural second divided areas provided by further dividing the first divided areas using calculated first thresholds, and produce binary images of captured images based on the calculated first thresholds and second thresholds; and
    a corresponding point sampling part configured to sample corresponding points between the images for calibration and the binary images,
    wherein the binary image producing part is configured to calculate the first thresholds and the second thresholds using one image among the captured plural images and produces a binary image of another image among the plural images using the calculated first thresholds and second thresholds.

6. The image processing device as claimed in claim 5, wherein:
    the projecting part is configured to project a white solid image and a black solid image among the plural images for calibration;
    the image capturing part is configured to capture each of images of areas including the projection object with a projected white solid image and black solid image; and
    the binary image producing part is configured to calculate a size(s) of the first divided areas using an image of an area with a projected captured white solid image and an image of an area with a projected captured black solid image.

7. An image projecting method, comprising:
a step of projecting a first image for calibration onto a projection object;
a step of capturing an image of an area including the projection object with a projected first image for calibration;
a step of calculating plural first thresholds corresponding to plural first divided areas provided by dividing the area based on a captured image;
a step of projecting a second image for calibration onto a projection object;
a step of capturing an image of an area including the projection object with a projected second image for calibration;
a step of producing binary images of images provided by capturing images of areas including the projection object(s) with the projected first image for calibration and the projected second image for calibration, based on the first thresholds; and
a step of sampling corresponding points between the first image for calibration and second image for calibration and the binary images.

8. The image projecting method as claimed in claim 7, wherein the step of producing binary images further includes a step of calculating plural second thresholds corresponding to plural second divided areas provided by dividing the first divided areas based on the first thresholds.

9. The image projecting method as claimed in claim 7, wherein the step of producing binary images includes a step of calculating a value of dispersion of pixel values of the captured image and calculating the first thresholds based on a calculated value of dispersion.

10. The image projecting method as claimed in claim 7, wherein the step of producing binary images includes a step of calculating an edge intensity of the captured image and calculating the first thresholds based on a calculated edge intensity.

11. A computer-readable recording medium, comprising a recoded program configured to cause a computer to execute the image projecting method as claimed in claim 7.

* * * * *